United States Patent
Matsuoka et al.

[19]

[11] Patent Number: 6,034,974
[45] Date of Patent: Mar. 7, 2000

[54] CHANNEL-SELECTION-TYPE DEMULTIPLEXING CIRCUIT

[75] Inventors: Shinji Matsuoka, Yokosuka; Yoshihiko Uematsu, Tokyo; Masahito Tomizawa, Yokohama, all of Japan

[73] Assignee: Nippon Telegraph and Telephone Corporation, Tokyo, Japan

[21] Appl. No.: 08/895,503

[22] Filed: Jul. 16, 1997

[30] Foreign Application Priority Data

Jul. 18, 1996 [JP] Japan .................................. 8-207925

[51] Int. Cl.[7] ............................................... H04J 3/02
[52] U.S. Cl. ............................................ 370/542; 370/536
[58] Field of Search ........................... 327/415; 370/535, 370/536, 542, 544, 503

[56] References Cited

U.S. PATENT DOCUMENTS 5,128,940  7/1992  Wakimoto ............................... 370/112

OTHER PUBLICATIONS

Abstract of Japanese Patent Application No. 1–212935 entitled "Multiplex Code Conversion System" (Aug. 25, 1989).

*Primary Examiner*—Chi H. Pham
*Assistant Examiner*—Kim T. Nguyen
*Attorney, Agent, or Firm*—Finnegan, Henderson, Farabow, Garrett & Dunner, L.L.P.

[57] ABSTRACT

The invention has the object of offering a channel-selection-type demultiplexing circuit which is capable of interchanging the time slots of demultiplexed signals when demultiplexing ultra-high-speed multi-channel multiplexed signal stream without expanding the scale of the circuits, and does not require the scale of the circuits to be expanded even if the speed of the transmission path increases. The invention is a channel-selection-type demultiplexing circuit capable of demultiplexing signals to a desired output port during bit demultiplexing, instead of simply demultiplexing the bits as in conventional devices, which performs bit demultiplexing based on a frequency division clock after selecting the bit signals to be demultiplexed to the desired output port from the N-channel multiplexed signal stream based on channel selection information.

15 Claims, 16 Drawing Sheets

SC2: CHANNEL-SELECTION-TYPE DEMULTIPLEXING CIRCUIT

FIG. 4 SC3a: CHANNEL-SELECTION-TYPE DEMULTIPLEXING CIRCUIT

FIG.6 SC3a: CHANNEL-SELECTION-TYPE DEMULTIPLEXING CIRCUIT

DMUX: BIT DEMULTIPLEXING CIRCUIT IN CHANNEL DEMULTIPLEXING SECTION

CHANNEL-SELECTION-TYPE DEMULTIPLEXING CIRCUIT

BACKGROUND OF THE INVENTION

1. Technical Field of the Invention

The present invention relates to a channel-selection-type demultiplexing circuit provided in an ADM device (Add-Drop Multiplexer) of a communication system, for demultiplexing ultra-high-speed multi-channel multiplexed signal streams.

2. Background Art

As the telephone-based communication networks of the past change into multi-media communication networks transmitting multi-media traffic such as computer information, high-capacity trunk transmission networks which can handle gigabit traffic will be required. Additionally, the conditions demanded of trunk transmission networks are predicted to diversify to cope with multi-media traffic. For constructing these high-capacity trunk networks, an ultra-high-speed ADM device is a key network element.

ADM devices are devices used when an N-channel multiplexed signal streams is sent from a transmitting station to a local station, for dropping the signals of specified channels at the local station, adding other signals to the same channels which had been assigned the dropped signals, and sending these along with the signals which were not dropped to a third station.

FIG. 11 is a diagram showing an example of the structure of a demultiplexing section SC11 in a conventional ADM device.

The demultiplexing section SC11 of this conventional ADM device first demultiplexes an N-channel multiplexed signal stream data-in at the demultiplexing section DMUX, then performs TSI (Time-Slot Interchange) of the signals of these demultiplexed channels using a channel selector having an ACM (Address Control Memory), after which add/drop selection is performed by an add/drop selector.

The channel selector used in the above conventional example is a type of memory. When N-channel multiplexed signal streams data-in are to be stored in this memory, each channel number and output port to be output from the memory are addressed for each N-channel multiplexed signal stream.

As conditions required of ADM devices in multi-media communication networks, the multiplexing speeds must become faster, the signal speeds of slower channels (tributary channels) must become faster, and the signal speeds of channels which are transmitted without being dropped (through-channels) must also become faster in order to cope with increased capacity. Furthermore, the signal speeds of channels handled by ADM devices will need to diversify for multi-media communications.

In order to put a conventional ultra-high-speed ADM device into practice, TSI of the ultra-high-speed multi-channel multiplexed signal streams must be performed. However, the TSI of multiple channels requires large-scale integrated circuits proportional to the number of channels. Additionally, if the speed of the transmission path which is the unit of TSI is increased, then a high-speed-operation memory in proportion to the speed of the path is also necessary. When the memory cannot operate at high speeds, the transmission path must be expanded until a speed at which the memory is capable of operating. However, in order to perform this expansion, the integrated circuits must be made larger still. Furthermore, when the speed of the transmission path which is the unit of TSI is diversified, then there are problems in the scale of circuitry with structures which use memories that operate at constant speeds.

SUMMARY OF THE INVENTION

The present invention has the object of offering a channel-selection-type demultiplexing circuit capable of interchanging the time slots of demultiplexed signals without large-scale integrated circuits, and does not require the circuits to be expanded even if the speed of the transmission paths is increased, when demultiplexing ultra-high-speed multi-channel multiplexed signal streams.

The present invention is a circuit capable of demultiplexing signals to a desired output port during bit demultiplexing, instead of simply demultiplexing the bit streams as in conventional devices, which performs bit demultiplexing by using a frequency division clock after selecting the bit signals to be demultiplexed to the desired output port from the N-channel multiplexed signal streams based on channel selection information.

The characteristics of the present invention shall be explained with reference to FIGS. 12–15. In FIGS. 12–15, the advantages of the present invention are given by showing three cases.

FIG. 12 is a case wherein the speed of the transmission path (1.25 Gbit/s in the drawing) which is a unit of TSI exceeds the memory operation speed (20 Mbit/s in the drawing). By using the present invention, demultiplexing circuits from 1.25 Gbit/s to 20 Mbit/s can be eliminated.

FIG. 13 is a case wherein the speed of the transmission path (1.25 Gbit/s and 2.4 Gbit/s) which is a unit of TSI is diverse. FIG. 14 is an example of a timing chart for explaining the signal demultiplexing process with channel selection according to the invention shown in FIG. 13. In FIG. 14, signals A–C respectively indicate the signals in the signal lines A–C of the present invention shown in FIG. 13. Here, the signal A is a multiplexed signal stream which is to be demultiplexed, and is a signal having sixteen repetition bit signals which are multiplexed (bit signal 1 to bit signal 16). In signal A, bit signal 1 is an output signal to channel #4, bit signals 2, 3, 5 and 7 are output signals to channel #5, bit signal 4 is an output signal to channel #3, bit signal 6 is an output signal to channel #2, bit signals 8, 10, 13 and 15 are output signals to channel #6, bit signal 9 is an output signal to channel #1, and bit signals 11, 12, 14 and 16 are output signals to channel #7. Additionally, four signals B are signals demultiplexed from the multiplexed signal stream (signal A), and the timing width of each signal (bit signals 1–16) in each signal B is four times the timing width of each signal (bit signals 1–16) in signal A. Additionally, four signals C are signals demultiplexed from the first signal B and are output signals to channels #1–#4, and the timing width of each signal (bit signals 1, 4, 6 and 9) in each signal C is four times the timing width of each signal (signals 1, 4, 6 and 9) in signal B. In this manner, the present invention selects specified bit signals from the multiplexed signal and changes the timing widths of the signals (i.e., changes the signal periods). As a result, the present invention allows additional circuits for diversifying the speed of the transmission path to be eliminated.

FIG. 15 is a case wherein the channels for delivering to the other transmission side in the ADM device without dropping are made high-speed. By using the present invention, the scale of the circuits can be largely reduced because the signals can be delivered without demultiplexing into lower speeds at which memories can operate.

According to the present invention, a channel selection clock corresponding to each specified channel is generated based on channel selection information input from an external source, and only the signals to be demultiplexed from the multiplexed signal stream input from an external source are demultiplexed by using this channel selection clock and a frequency division clock. As a result, when an ultra-high-speed multi-channel multiplexed signal stream is to be demultiplexed, time-slot interchange of the demultiplexed signals can be performed without expanding the scale of the circuit, and there is no need to expand the scale of the circuit even if the speed of the transmission path increases.

Additionally, the channel-selection-type demultiplexing circuit of the present invention may be connected in Q stages (wherein Q is an integer of at least 2). In this case, since a plurality of channel-selection-type demultiplexing circuits are arranged in a pyramid shape, each channel-selection-type demultiplexing circuit can be achieved at a circuit scale corresponding to the processing speed, and ultra-high-speed multi-channel multiplexed signal streams can be demultiplexed overall. Additionally, time-slot interchange of the demultiplexed signals can be performed without expanding the scale of the circuits. Additionally, even if the speed of the transmission path is increased, there is no need to expand the scale of the circuits.

Additionally, the channel selection clock generating section may be provided with M feedback-type N-bit shift registers for inputting the channel selection information (wherein N is the number of channels of the multiplexed signal stream) and a signal separation clock generating section for generating M types of channel selection clocks based on control signals outputted by said M types of feedback-type N-bit shift registers and supplying the channel selection clocks to said channel demultiplexing section. In this case, control signals for channel selection are generated by using feedback-type N-bit shift registers based on channel selection information for each demultiplexed channel, and then channel selection clocks for each channel are generated by taking the logical product of these control signals and input clocks from an external source. Only the signals to be demultiplexed from the multiplexed signal stream are demultiplexed using this channel selection clock and frequency division clock, it is possible to achieve a channel-selection-type demultiplexing circuit which demultiplexes the multi-channel multiplexed signal streams into demultiplexed channels and outputs these into arbitrary output ports.

Additionally, the channel selection clock generating section may be provided with k feedback-type N-bit shift registers for inputting the channel selection information (wherein N is the number of channels of the multiplexed signal stream), and a channel selection clock generating circuit for generating M types of channel selection clocks based on control signals outputted by said k feedback-type N-bit shift registers and supplying the channel selection clocks to said channel demultiplexing section. Here, k is the minimum integer greater than or equal to (log M/log 2). In this case, when generating the control signals for each selection channel, the circuits generating the control signals (i.e. the time series signals) are not formed independently for each selection channel, and a common structure is provided, so as to allow the number of circuits for generating time series control signals to be reduced.

Additionally, the channel selection clock generating section may be provided with an N-bit counter for generating a clock having a period which is 1/F times the period of the multiplexed signal stream which has a period of N bits, (wherein N is the number of channels in the multiplexed signal stream and N/F is an integer), k feedback-type N/F-bit shift registers for sequentially selecting a portion of the channel selection information based on the clock having 1/F times the period, and inputting the selected channel selection information, and a channel selection clock generating circuit for generating M types of channel selection clocks based on control signals outputted by said k feedback-type N/F-bit shift registers and supplying the channel selection clocks to said channel demultiplexing section. Here, k is the minimum integer greater than or equal to (log M/log 2). In this case, when generating the control signals for each selection channel, the control signals (i.e., time series signals) are generated by performing the replacement of the channel selection information to the channel selection clock generating section at a period which is 1/F times the period of the multiplexed signal stream, so that the number of circuits for generating the time series control signals can be further reduced.

Additionally, the channel demultiplexing section may be provided with a first buffer for inputting the multiplexed signal stream, a second buffer for inputting the multiplexed signal stream, a 2×N-period clock generating circuit for generating a clock having a period which is twice the period of the multiplexed signal stream, by further dividing the frequency division clock outputted by said frequency division clock generating section, a 2:2 selector for alternately selecting the channel selection clock outputted by said channel selection clock generating section and the frequency division clock outputted by said frequency division clock generating section based on the 2×N-period clock, and alternately supplying the selected clock to said first buffer and said second buffer, and a 2:1 selector for selecting and outputting the signals outputted by one of said first buffer and said second buffer, based on the 2×N-period clock. In this case, the channel selection clock and the frequency division clock can be interchanged by the 2:2 selector, and the two N/M-bit buffers can be operated by using these two types of clocks in order to perform inputting and outputting of the multiplexed signal stream. Then, by using the 2:1 selector to select the signals outputted by these two buffers, it is possible to achieve a channel demultiplexing section for a channel-selection-type demultiplexing circuit which demultiplexes signals into arbitrary output channels when ultra-high-speed multi-channel multiplexed signals are being demultiplexed.

Additionally, the frequency division clock generating section may be provided with a frequency division circuit which is set to a specific value based on a frame synchronization signal synchronized with the multiplexed signal stream. In this case, a frequency division clock having a period which is $2^k$ times is generated by using k TFFs, and setting the frequency division clock to a specific value synchronized with the frame synchronization signal, so that in a channel-selection-type demultiplexing circuit for demultiplexing signals from a multiplexed signal stream and outputting the demultiplexed signals to arbitrary output channels, a frequency division clock synchronized with the multiplexed signal stream with $2^k$ times the period can be generated.

PREFERRED EMBODIMENTS OF THE INVENTION

Hereinbelow, embodiments of the present invention will be explained with reference to the drawings.

Figure 1:
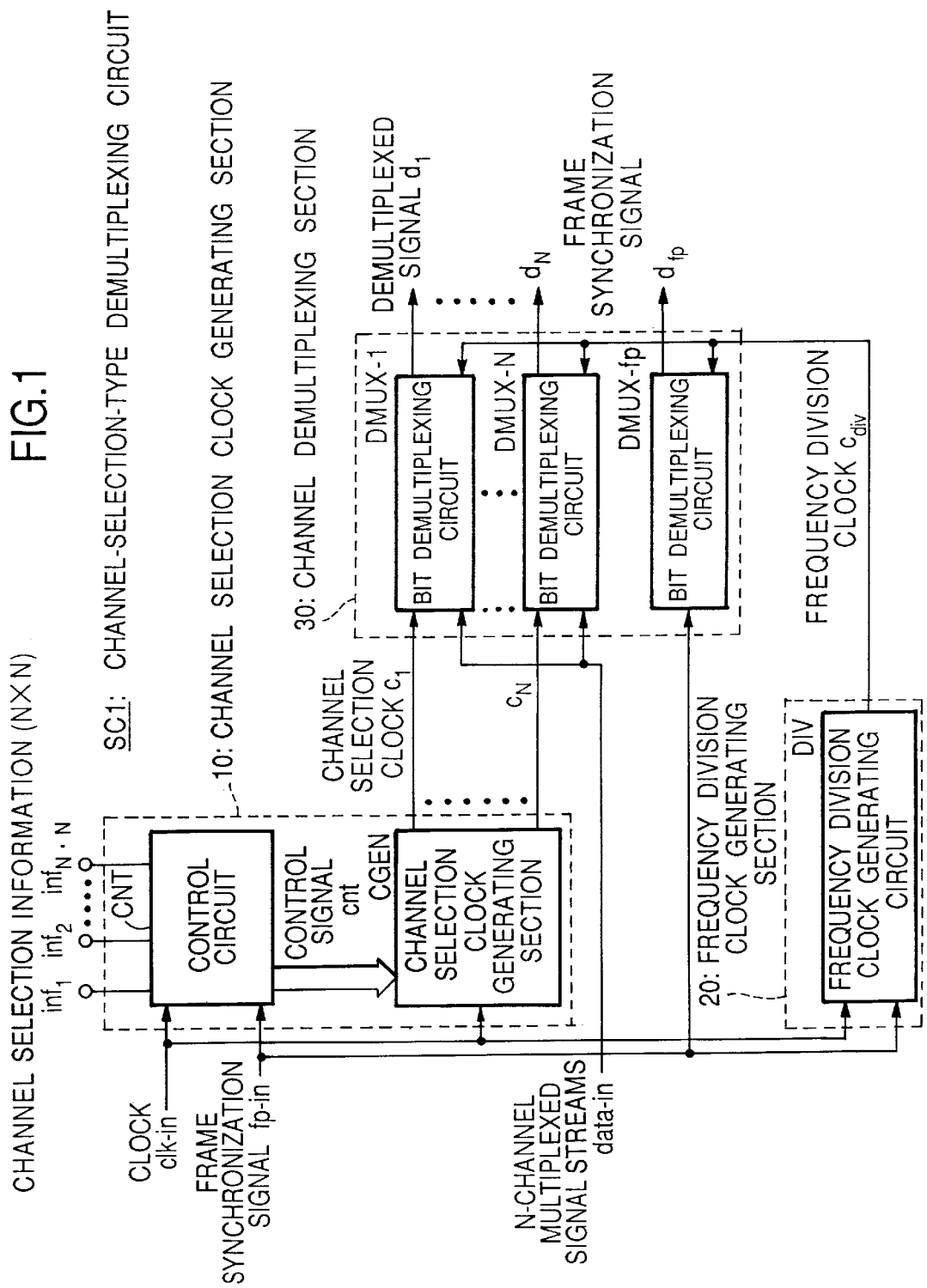
FIG. 1 is a block diagram showing an example of the structure of a channel-selection-type demultiplexing circuit SC1 according to a first embodiment of the present invention.

FIG. 1 is a block diagram showing an example of the structure of a channel-selection-type demultiplexing circuit SC1 according to a first embodiment of the present invention. The channel-selection-type demultiplexing circuit SC1 corresponds to claim 1.

In general, the channel-selection-type demultiplexing circuit SC1 is a circuit for demultiplexing and outputting demultiplexed signals from an N-channel multiplexed signal stream to M output ports (where $M \leq N$). In the following explanation, the case wherein M=N is explained as an example.

The channel-selection-type demultiplexing circuit SC1 is a circuit which demultiplexes the N-channel multiplexed signal stream data-in into N signals based on channel selection information $inf_1$–$inf_{N.N}$, and outputs demultiplexed signals $d_1$–$d_N$ which are the demultiplexed signals to arbitrary output ports. Additionally, the channel-selection-type demultiplexing circuit SC1 has a channel selection clock generating section 10, a frequency division clock generating section 20 and a channel demultiplexing section 30. The channel selection information $inf_1$–$inf_{N.N}$ is information for indicating the channel numbers of signals to be demultiplexed from the N-channel multiplexed signal stream data-in, and the output port numbers to which the demultiplexed signals are outputted.

The channel selection clock generating section 10 is a section for generating the channel selection clocks $c_1$–$c_N$. These channel selection clocks $c_1$–$c_N$ are clocks for selecting the signals to be demultiplexed to specified output ports from the N-channel multiplexed signal stream data-in based on channel selection information $inf_1$–$inf_{N.N}$ inputted from outside the channel-selection-type separation circuit SC1. Additionally, the channel selection clock generating section 10 has a control circuit CNT and a channel selection clock generating circuit CGEN.

The control circuit CNT is a circuit for outputting a control signal cnt to the channel selection clock generating circuit CGEN. The control signal cnt is a control signal for selecting the specified channel from the N-channel multiplexed signal stream data-in based on the channel selection information $inf_1$–$inf_{N.N}$. The control signal cnt is generated based on a frame synchronization signal $f_p$-in and an input clock clk-in which is inputted from an external source. The frame synchronization signal $f_p$-in is a signal which is synchronized with the input clock clk-in which is inputted from an external source and the N-channel multiplexed signal stream data-in.

The channel selection clock generating circuit CGEN is a circuit for generating N types of channel selection clocks $c_1$–$c_N$. The channel selection clocks $c_1$–$c_N$ are control clock signals for latching the bit signals to be selected from the N-channel multiplexed signal stream data-in to the respective selected channels based on the control signal cnt outputted by the control circuit CNT and the input clock clk-in.

That is, the channel selection clock generating section 10 is a section for generating channel selection clocks $c_1$–$c_N$ based on the channel selection information $inf_1$–$inf_{N.N}$ which assigns the channel numbers of the signals to be selected from the N-channel multiplexed signal stream data-in and the output channel numbers for outputting the selected signals. Here, the channel selection clocks $c_1$–$c_N$ are for selecting the bit signals to be selected from the N-channel multiplexed signal stream data-in.

The frequency division clock generating section 20 is a section for generating a frequency division clock $c_{div}$ based on the multiplexed input clock clk-in which is synchronized with the N-channel multiplexed signal stream data-in, and has a frequency division clock generating circuit DIV. The frequency division clock $c_{div}$ is a division clock signal generated by dividing the multiplexed input clock clk-in inputted from an external source to N times the period. Additionally, the frequency division clock generating section 20 is set (or reset) by a frame synchronization signal $f_p$-in which is inputted from an external source when the frequency division clock $c_{div}$ is generated, thereby generating a frequency division clock $c_{div}$ having N times the period synchronized with the frame synchronization signal $f_p$-in.

The channel demultiplexing section 30 generates N types of demultiplexed signals $d_1$–$d_N$ having N times the period of the N-channel multiplexed signal stream data-in based on the channel selection clocks $c_1$–$c_N$ outputted by the channel selection clock generating section 10 and the frequency division clock $c_{div}$ outputted by the frequency division clock generating section 20. Additionally, the channel demultiplexing section 30 generates a frame synchronization signal $d_{fp}$ having N times the period of the frame synchronization signal $f_p$-in based on the frame synchronization signal $f_p$-in synchronized with the N-channel multiplexed signal stream data-in. Additionally, the channel demultiplexing section 30 has bit demultiplexing circuits DMUX-1 through DMUX-N, and a bit demultiplexing circuit DMUX-fp. The bit demultiplexing circuit DMUX-fp is a circuit which is required in order to connect the channel-selection-type demultiplexing circuits in multiple stages (see FIGS. 2A), and the bit demultiplexing circuit DYUX-fp is unnecessary when the channel-selection-type demultiplexing circuit is used in only a single stage.

According to the channel-selection-type demultiplexing circuit of the above-described embodiment, it is possible to achieve a channel-selection-type demultiplexing circuit capable of outputting selected bit signals to arbitrary output channels during bit demultiplexing of ultra-high-speed multi-channel multiplexed signals (N-channel multiplexed signal streams). Thus, the bit demultiplexing operation can be performed while simultaneously outputting the selected channel signals to specified output ports, consequently eliminating the need for TSI (channel interchange for multiple channels).

Figure 2:
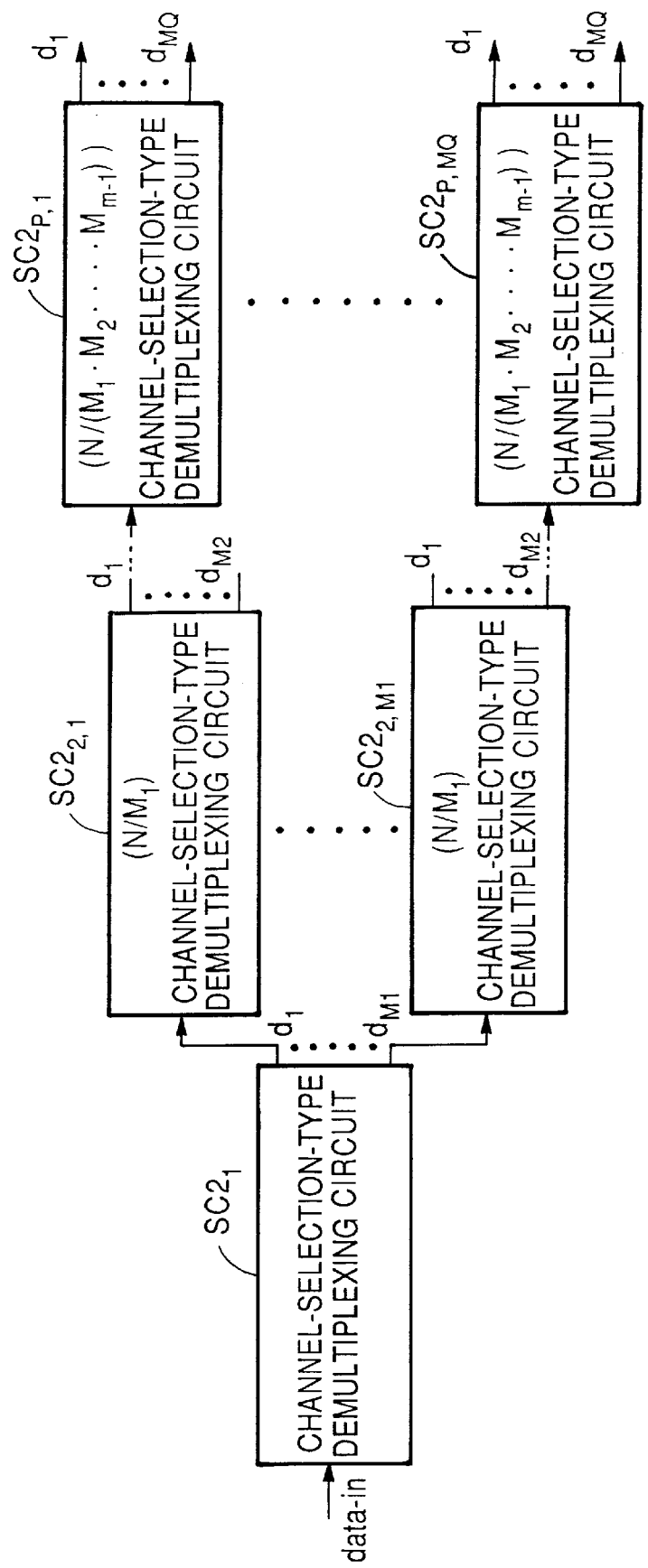
FIG. 2A is a block diagram showing an example of the structure of a channel-selection-type demultiplexing circuit SC2 according to a second embodiment of the present invention.
FIG. 2B is a block diagram showing an example of the structure of a channel-selection-type demultiplexing circuit $SC2_1$ according to a second embodiment of the present invention.
Figure 2B:
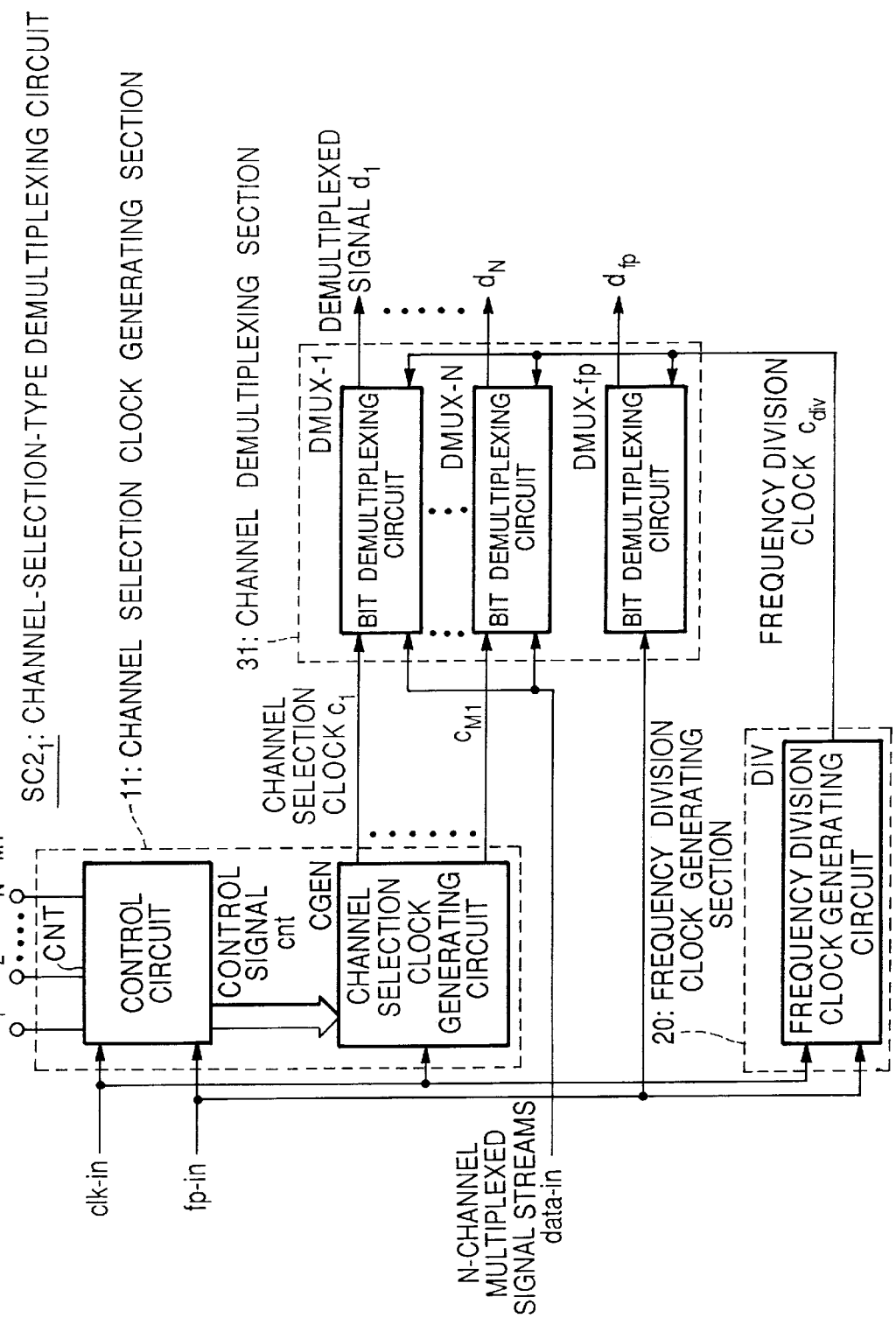

FIG. 2A is a block diagram showing an example of the structure of a channel-selection-type demultiplexing circuit SC2 which is a second embodiment of the present invention. Additionally, FIG. 2B is a block diagram showing an example of the structure of a channel-selection-type demultiplexing circuit $SC2_1$ which is one of a plurality of channel-selection-type demultiplexing circuits used in the channel-selection-type demultiplexing circuit SC2. The channel-selection-type demultiplexing circuit SC2 corresponds to the embodiment recited in claim 3.

The channel-selection-type demultiplexing circuit SC2 comprises an N-channel-selection-type demultiplexing circuit $SC2_1$ for demultiplexing the N-channel multiplexed signal stream data-in into M1 demultiplexed signals based on channel selection information, M1 (N/M1)-channel-selection-type demultiplexing circuits $SC_{2,1}$–$SC_{2,M1}$ for demultiplexing the demultiplexed signals $d_1$–$d_{M1}$ outputted by the N-channel-selection-type demultiplexing circuit $SC2_2$ respectively into M2 demultiplexed signals, and this is repeated over many stages.

That is, the channel-selection-type demultiplexing circuit SC2 has a plurality of channel-selection-type demultiplexing circuits arranged in pyramid fashion, wherein the channel-selection-type demultiplexing circuit of the first stage demultiplexes the N-channel multiplexed signal stream data-in into a first number of multiplexed signal streams, then the channel selection-type demultiplexing circuits of the second stage demultiplex the multiplexed signal streams respectively outputted by the first-stage channel-selection-type demultiplexing circuit into a second number of multiplexed signal streams, and this is repeated over many stages.

In other words, the channel-selection-type demultiplexing circuit SC2 has a plurality of channel-selection-type demultiplexing circuits arranged in pyramid fashion, wherein the first-stage channel-selection-type demultiplexing circuit demultiplexes the N-channel multiplexed signal stream data-in into a first number (M1) multiplexed signal streams, then the second-stage channel-selection-type demultiplexing circuits demultiplex the multiplexed signal streams respectively outputted by the first-stage channel-selection-type demultiplexing circuit into a second number (M2) multiplexed signal streams, and this is repeated over many stages until the P-stage channel-selection-type demultiplexing circuits respectively demultiplex the multiplexed signal stream outputted by the (P–1)-th channel-selection-type demultiplexing circuits into a P-th number (MQ) of multiplexed signal streams (wherein P and MQ are positive integers greater than or equal to 2).

As shown in FIG. 2B, the channel-selection-type demultiplexing circuit $SC2_1$ has fundamentally the same structure as the channel-selection-type demultiplexing circuit SC1 shown in FIG. 1. However, the channel-selection-type demultiplexing circuit $SC2_1$ demultiplexes the N-channel multiplexed signal stream into M1 demultiplexed signals, and therefore the channel-selection-type demultiplexing circuit SC1 and the channel-selection-type demultiplexing circuit $SC2_1$ are different with regard to the number of output signals after demultiplexing. First, they differ in that while the channel-selection-type demultiplexing circuit SC1 uses the channel selection information $\inf_1$–$\inf_{N,N}$, the channel-selection-type demultiplexing circuit $SC2_1$ uses the channel selection information $\inf_1$–$\inf_{N,M1}$. Additionally, since M1 demultiplexed signals (multiplexed signal streams) are outputted by the channel-selection-type demultiplexing circuit $SC2_1$, it is different from the channel-selection-type demultiplexing circuit SC1 in that it required M1 bit demultiplexing circuits.

The channel-selection-type demultiplexing circuit $SC2_1$ has a channel selection clock generating section 11, a frequency division clock generating section 20 and a channel demultiplexing section 31.

The control circuit CNT inside the channel selection clock generating section 11 is a circuit for outputting a control signal cnt to the channel selection clock generating circuit CGEN. The control signal is for performing selection of the channel signal based on the channel selection information $\inf_1$–$\inf_{N,M1}$ for demultiplexing the N-channel multiplexed signal stream data-in into M1 demultiplexed signals. In this case, the control signal cnt is generated based on the input clock clk-in inputted from an external source and the frame synchronization signal $f_p$-in synchronized with the N-channel multiplexed signal stream data-in.

The channel selection clock generating section CGEN is a circuit for generating M1 types of channel selection clocks (control clocks) $c_1$–$c_{M1}$ for latching the bit signals to be selected to demultiplexed channels from the N-channel multiplexed signal stream data-in based on the control signal cnt outputted by the control circuit CNT and the input clock clk-in.

The frequency division clock generating circuit DIV is a circuit for generating a frequency division clock $c_{div}$ which is the clock signal divided into M1 times the period, based on the input clock clk-in inputted from an external source. Additionally, when the frequency division clock $c_{div}$ is generated, the frequency division clock $c_{div}$ is synchronized with the frame synchronization signal $f_p$-in by setting (or resetting) the frequency division clock $c_{div}$ based on the frame synchronization signal $f_p$-in which is inputted from an external source.

The bit demultiplexing circuits DMUX-1 to DMUX-M1 in the channel demultiplexing section 31 independently latch each channel of the N-channel multiplexed signal stream data-in based on the channel selection clocks $c_1$–$c_{M1}$ outputted by the channel selection clock generating circuit CGEN, then generates demultiplexed signals $d_1$–$d_{M1}$ having 1/M1 times the multiplexing speed as the multiplexing speed of the N-channel multiplexed signal stream based on the frequency division clock $c_{div}$ outputted by the frequency division clock generating circuit DIV. The frame synchronization signal $f_p$-in inputted from an external source is directly converted into a frame synchronization signal $d_{fp}$ having a clock speed which is 1/M1 times the multiplexing speed of the N-channel multiplexed signal stream based on the frequency division clock $c_{div}$.

Additionally, among the plurality of channel-selection-type demultiplexing circuits forming the channel-selection-type demultiplexing circuit SC2, the circuit structures of the channel-selection-type demultiplexing circuits other than the channel-selection-type demultiplexing circuit $SC2_1$ are identical to the circuit structure of the channel-selection-type demultiplexing circuit $SC2_1$, and are different only in that the number of output demultiplexed signals (M1) of the channel-selection-type demultiplexing circuits $SC2_1$ are specified for each circuit.

According to the above-mentioned channel-selection-type demultiplexing circuit SC2, it is possible to achieve a channel-selection-type demultiplexing circuit wherein bits can be selected into arbitrary output channels when demultiplexing the bits of an ultra-high-speed multi-channel multiplexed signal (N-channel multiplexed signal streams). As a result, there is no need to perform TSI (interchange of multiple channels) since the demultiplexed signals can be outputted to specified output ports simultaneously with the signal demultiplexing operation.

Figure 3:
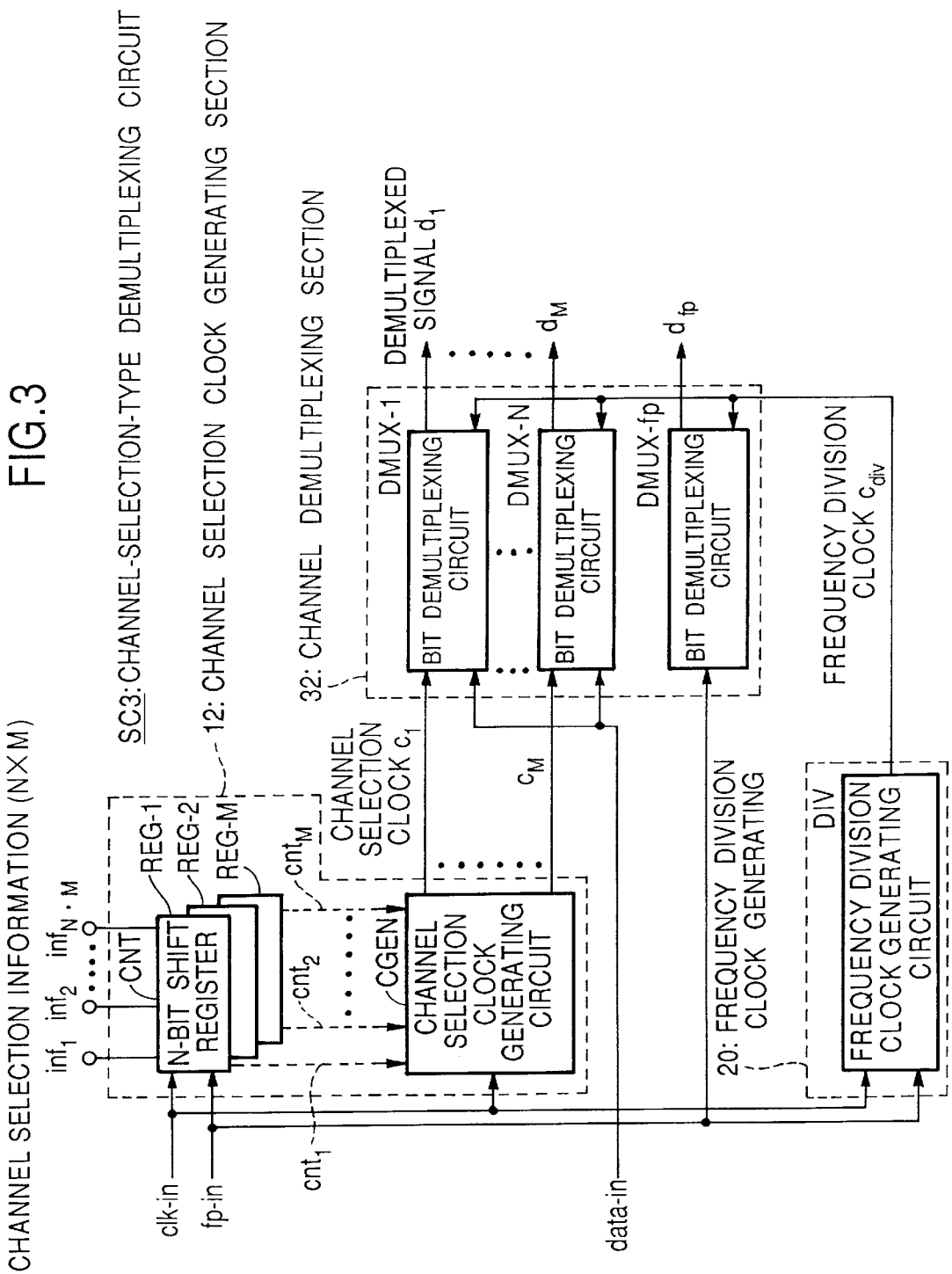
FIG. 3 is a block diagram showing an example of the structure of a channel-selection-type demultiplexing circuit SC3 according to a third embodiment of the present invention.

FIG. 3 is a block diagram showing an example of the structure of a channel-selection-type demultiplexing circuit SC3 according to a third embodiment of the present invention. This channel-selection-type demultiplexing circuit SC3 corresponds to claim 4.

The channel-selection-type demultiplexing circuit SC3 is an N-channel-selection-type demultiplexing circuit for demultiplexing the N-channel multiplexed signal stream data-in into M demultiplexed signals. Additionally, the channel-selection-type demultiplexing circuit SC3 has a channel selection clock generating section 12, a frequency division clock generating section 20 and a channel demultiplexing section 32. The separation clock generating section 12 receives N×M channel separation information $inf_1$–$inf_{N\cdot M}$ as inputs and has M (M≦N) feedback-type N-bit shift registers REG-1, REG-2, ..., REG-M.

In the channel-selection-type demultiplexing circuit SC3, the N-bit shift register REG-t (1≦t≦M) generates a control signal $cnt_t$. This control signal $cnt_t$ is synchronized with the N-channel multiplexed signal stream data-in and is the information required to select the signal to the output port t based on the N×M channel selection information $inf_1$–$inf_{N\cdot M}$. Additionally, the control signal $cnt_t$ is a control signal comprising bit signal streams wherein the portions corresponding to the signals to be selected and outputted to the output port t equal to "1" and the portions corresponding to signals which are not to be selected and outputted to the output port t equal to "0".

The channel selection clock generating circuit CGEN in the channel selection clock generating section 12 generates a channel selection clock $c_t$ by taking the logical product of the control signal $cnt_t$ outputted from the N-bit shift register REG-t and the multiplexed input clock clk-in. This channel selection clock $c_t$ is a clock signal having a clock pulse at only the portions of the signal to be selected and outputted to the output port t.

The frequency division clock generating circuit DIV of the frequency division clock generating section 20 generates a frequency division clock $c_{div}$ which is a division clock generated by dividing the input clock clk-in inputted from an external source into M times the period. Additionally, the frequency division clock generating circuit DIV is a circuit for generating a frequency division clock having M times the period and synchronized with the frame synchronization signal $f_p$-in by setting (or resetting) a frequency division clock $c_{div}$ with a frame synchronization signal $f_p$-in when the frequency division clock $c_{div}$ is generated.

The bit demultiplexing circuits DMUX-1 to DMUX-M in the channel demultiplexing section 32 independently latch each channel of the N-channel multiplexed signal stream data-in based on the channel selection clocks $c_1$–$c_M$ outputted by the channel selection clock generating circuit CGEN, then generates demultiplexed signals $d_1$–$d_M$ having 1/M times the multiplexing speed as the multiplexing speed of the N-channel multiplexed signal stream based on the frequency division clock $c_{div}$ outputted by the frequency division clock generating circuit DIV. The frame synchronization signal $f_p$-in inputted from an external source is directly converted into a frame synchronization signal $d_{fp}$ having a clock speed which is 1/M times the multiplexing speed of the N-channel multiplexed signal stream based on the frequency division clock $c_{div}$.

Due to this structure, when the ultra-high-speed multi-channel multiplexed signal (N-channel multiplexed signal stream) is demultiplexed, the demultiplexed signals can be outputted to arbitrary channels.

Figure 4:
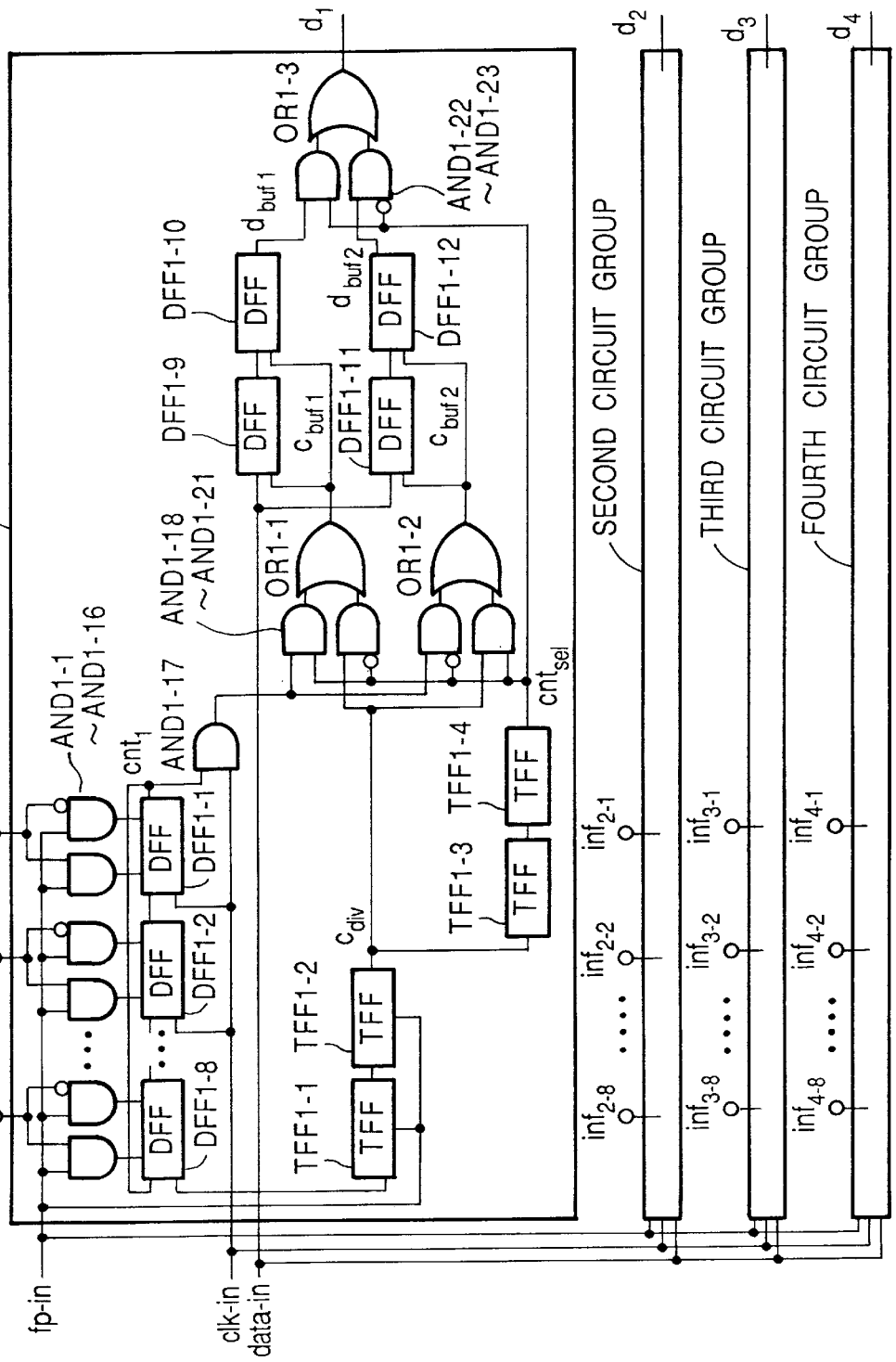
FIG. 4 is a circuit diagram showing the structure of a channel-selection-type demultiplexing circuit SC3a which is a specific example of the channel-selection-type demultiplexing circuit SC3.

FIG. 4 is a circuit diagram showing the structure of a channel-selection-type demultiplexing circuit SC3a which is a specific example of the channel-selection-type demultiplexing circuit SC3.

The channel-selection-type demultiplexing circuit SC3a is a demultiplexing circuit for demultiplexing an 8-channel multiplexed signal stream data-in into four demultiplexed signals.

In the channel-selection-type demultiplexing circuit SC3a, AND1-1 through AND2-16 receive the channel selection information $inf_{1-1}$–$inf_{1-8}$ corresponding to the first demultiplexed channel CH1 with the frame synchronization signal $f_p$-in as the trigger, and sets or resets DFF1-1 to DFF1-8. The control signal (time series signal) $cnt_1$ outputted by DFF1-1 is operated by AND1-17 to find the logical product with the input clock clk-in inputted from an external source, and this becomes the channel selection clock $c_1$ for the demultiplexed channel CH1.

TFF1-1 and TFF1-2 generate a frequency division clock $c_{div}$ having four times the period. TFF1-3 and TFF1-4 generate a clock having sixteen times the period and sends this as the control signal $cnt_{sel}$. AND1-18 through AND1-21 and OR1-1 and OR1-2 form a 2:2 selector for switching between the channel selection clock $c_1$ and the frequency division clock $c_{div}$ based on the control signal $cnt_{sel}$.

DFF1-9 and DFF1-10 correspond to a first buffer BUF1 (see FIG. 9) to be explained below, which has the signal $c_{buf1}$ outputted by OR1-1 as a clock and buffers the 8-channel multiplexed signal stream data-in which is inputted from an external source. DFF1-11 and DFF1-12 also form a second buffer BUF2 (see FIG. 9) for buffering the 8-channel multiplexed signal stream data-in. AND1-22, AND1-23 and OR1-3 correspond to a 2:1 selector (see FIG. 9) to be explained below, which selects the output signal $d_{buf1}$ of DFF1-10 or the output signal $d_{buf2}$ of DFF1-12 based on the control signal $cnt_{sel}$ outputted by TFF1-4.

The circuits corresponding to the other channels CH2 through CH4 (second circuit group through fourth circuit group) also have the same circuit structure as the first circuit group.

As described above, the present circuit is capable of generating a clock for channel selection by setting/resetting channel selection information to the feedback-type shift registers REG-1, REG-2, . . . , REG-M to generate a time series control signal, then taking the logical product of this time series control signal and an input clock from an external source. Additionally, with the present circuit, it is possible to select the channels based on the channel selection clock by forming selector circuits using AND circuits and OR circuits, and buffer circuits based on DFFs.

Figure 5:
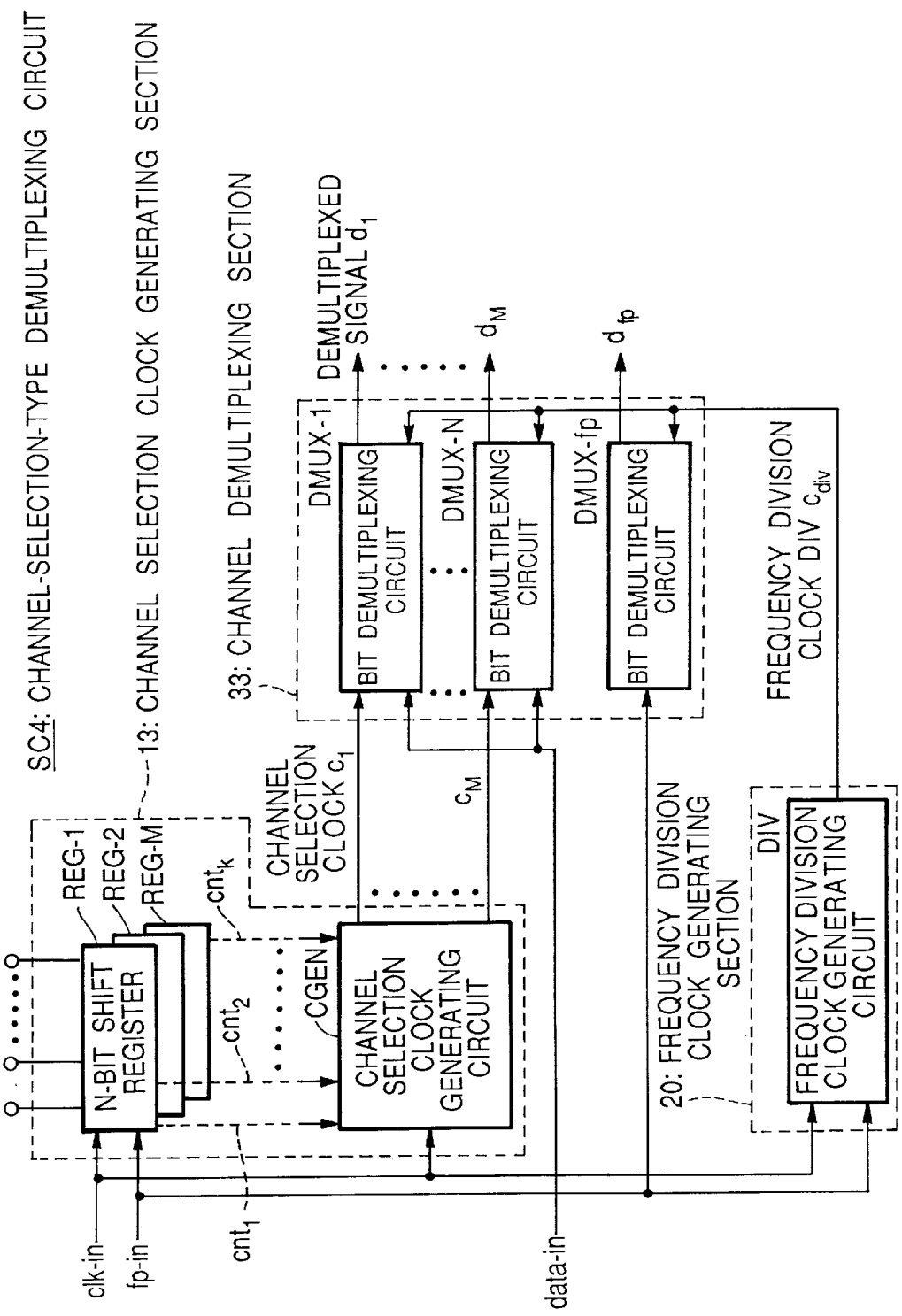
FIG. 5 is a block diagram showing an example of the structure of a channel-selection-type demultiplexing circuit SC4 according to a fourth embodiment of the present invention.

FIG. 5 is a block diagram showing an example of the structure of a channel-selection-type demultiplexing circuit SC4 according to a fourth embodiment of the present invention. This channel-selection-type demultiplexing circuit SC4 corresponds to claim 5.

The channel-selection-type demultiplexing circuit SC4 is the same as the channel-selection-type demultiplexing circuit SC3 shown in FIG. 3 except that the number of N-bit shift registers of the channel selection clock generating section 12 is reduced from M to k (wherein k is the smallest integer which satisfies the relation k≧log M/log 2).

The channel-selection-type demultiplexing circuit SC4 has a channel selection clock generating section 13, a frequency division clock generating section 20 and a channel demultiplexing section 33. The channel selection clock generating section 13 receives N×M channel selection information $inf_1$–$inf_{N.M}$ as inputs, and has k N-bit shift registers REG-1, REG-2, . . . , REG-k.

While the control signal for selecting signals to the output port t is generated by only the N-bit shift register REG-t in the structure of the channel-selection-type demultiplexing circuit SC3, the structure of the channel-selection-type demultiplexing circuit SC4 is such that the control signal for selecting signals to the output port t is generated by using all of the N-bit shift registers REG-1 through REG-k. That is, when the n-th bit in the N-bit multiplexed signal stream is the signal to be selected to the output port t, the content of the n-th flip-flop among the N flip-flops forming each of the N-bit registers REG-1 through REG-k is set to binary information for expressing the output port t (i.e., k bit binary data).

The channel selection clock generating circuit CGEN generates a channel selection clock $c_t$ having a clock pulse at only the portions of the bit signals to be selected to the output port t, by generating a new control signal for the output port t based on the control signals $cnt_1$–$cnt_k$ outputted from the N-bit shift registers REG-1 through REG-k, and taking the logical product of this control signal with the multiplexed input clock clk-in inputted from an external source.

According to this channel-selection-type demultiplexing circuit SC4, it is possible to achieve a channel-selection-type demultiplexing circuit which demultiplexes an ultra-high-speed multi-channel multiplexed signal (N-channel multiplexed signal stream) and outputs these demultiplexed signals to arbitrary channels, with a small number of circuits.

Figure 6:
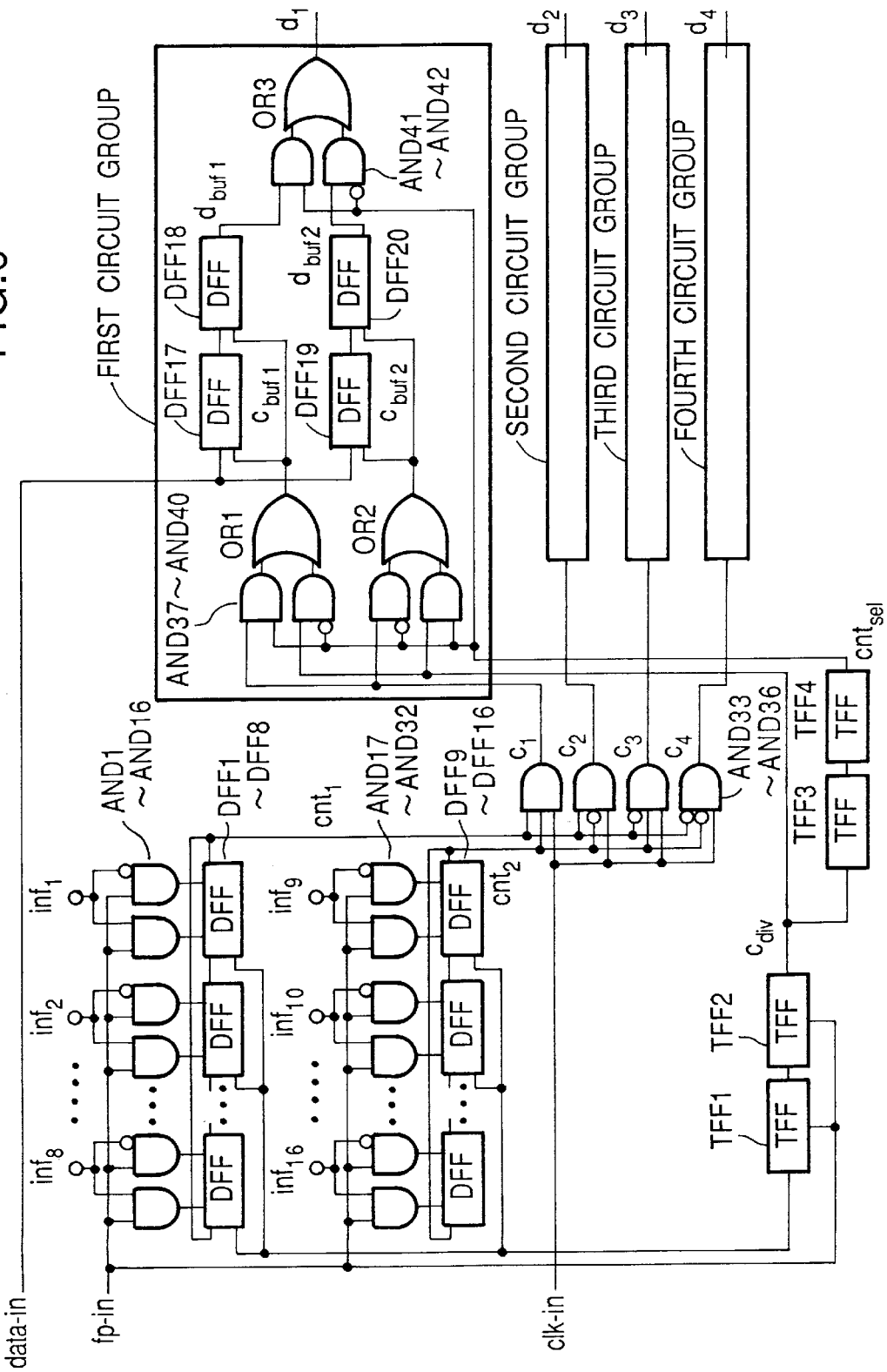
FIG. 6 is a circuit diagram showing the structure of a channel-selection-type demultiplexing circuit SC4a which is a specific example of the channel-selection-type demultiplexing circuit SC4.

FIG. 6 is a circuit diagram showing the structure of a channel-selection-type demultiplexing circuit SC4a which is a specific example of the channel-selection-type demultiplexing circuit SC4.

The channel-selection-type demultiplexing circuit SC4a is a demultiplexing circuit for demultiplexing the 8-channel multiplexed signal stream data-in into four demultiplexed signals.

While the channel-selection-type demultiplexing circuit SC3a shown in FIG. 4 generates the control signal $cnt_{sel}$ for the demultiplexed channel CH1 with a DFF group (DFF1-1 through DFF1-8) independent of the other demultiplexed channels CH2–CH4, the channel-selection-type demultiplexing circuit SC4a produces it by using two (i.e., log 4/log 2=2) DFF groups which generate time series signals.

In the channel-selection-type demultiplexing circuit SC4a, AND1–AND32 perform the logical product of the channel selection information $inf_{1-1}$–$inf_{1-16}$ and the frame synchronization signal $f_p$-in inputted as a trigger, and sets or resets DFF1–DFF16 according to the output signals. AND33–AND36 operate on the time series control signals $cnt_1$ and $cnt_2$ outputted by DFF8 and DFF16 for their logical product with the input clock clk-in inputted from an external source, and these form channel selection clocks $c_1$–$c_4$ for the demultiplexed channels CH1–CH4. At this time, the demultiplexed channels are identified by the combination of "0"s and "1"s of the control signals $cnt_1$ and $cnt_2$. For example, when $cnt_1$=0 and $cnt_2$=0, CH1 is identified as the demultiplexed channel, when $cnt_1$=0 and $cnt_2$=1, CH2 is identified as the demultiplexed channel, when $cnt_1$=1 and $cnt_2$=0, CH3 is identified as the demultiplexed channel, and when $cnt_1$=1 and $cnt_2$=1, CH1 is identified as the demultiplexed channel.

In the channel-selection-type demultiplexing circuit SC4a, the circuit structures other than those explained above are identical to the channel-selection-type demultiplexing circuit SC3a.

In this way, with the present circuit, the circuit for generating a time series control signal for channel selection is not composed independently for each channel; due to the provision of a common structure, it is possible to reduce the number of circuits producing the time series control signals.

Figure 7:
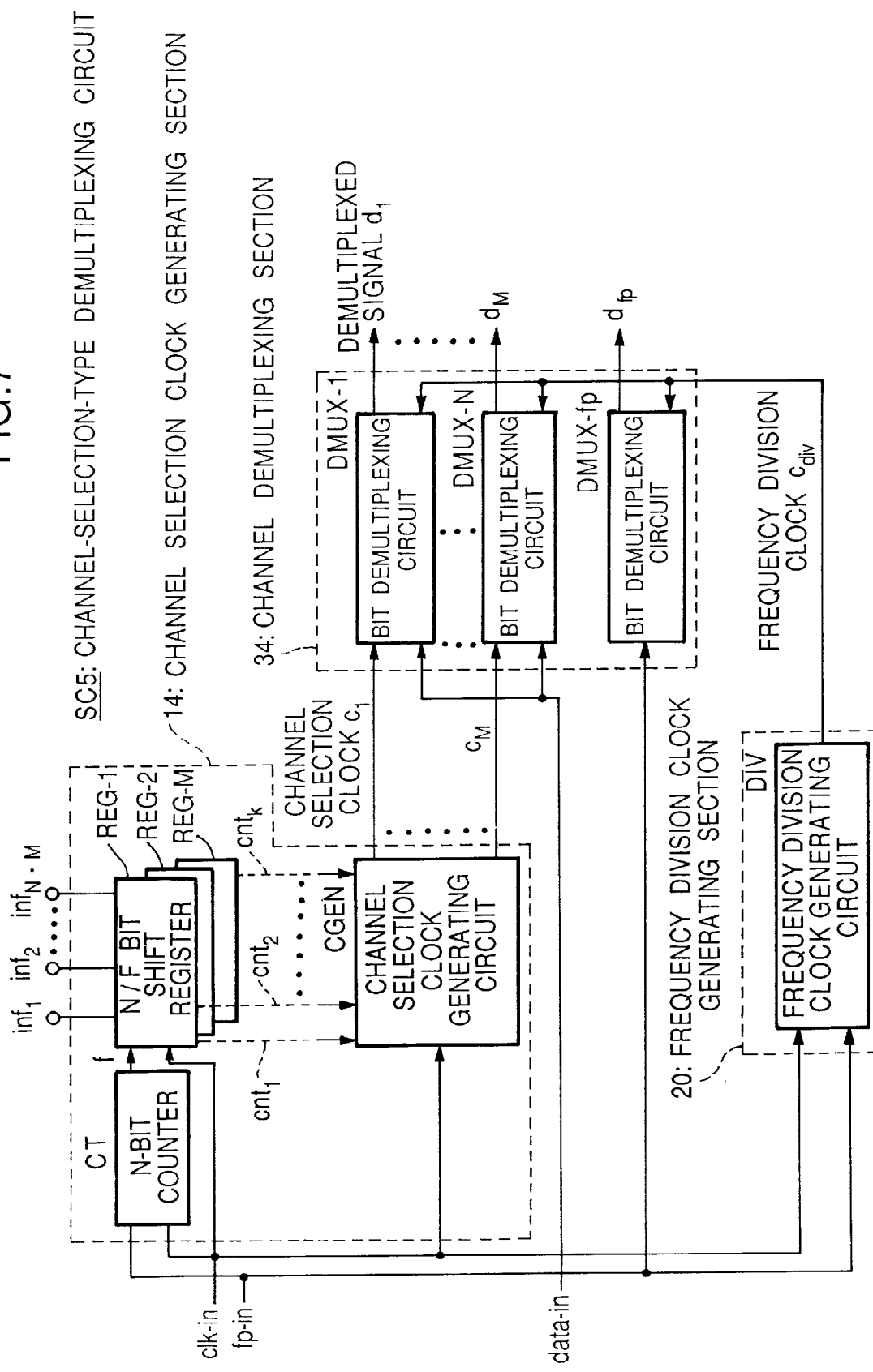
FIG. 7 is a block diagram showing an example of the structure of a channel-selection-type demultiplexing circuit SC5 according to a fifth embodiment of the present invention.

FIG. 7 is a block diagram showing an example of the structure of a channel-selection-type demultiplexing circuit SC5 according to a fifth embodiment of the present invention. This channel-selection-type demultiplexing circuit SC5 corresponds to claim 6.

The channel-selection-type demultiplexing circuit SC5 has the number of stages of the shift registers in the channel selection clock generating section 13 reduced from N bits to N/F bits with respect to the channel-selection-type demultiplexing circuit SC4 shown in FIG. 5.

The channel-selection-type demultiplexing circuit SC5 has a channel selection clock generating section 14, a frequency division clock generating section 20 and a channel demultiplexing section 34.

While the channel-selection-type demultiplexing circuit SC4 produces a control signal for selecting signals to the output port t at the N-bit shift register, the channel-selection-type demultiplexing circuit SC5 generates counter information (shift register control signal f) corresponding to 1/F times the period of the N-bit multiplexed signal stream, and replaces the channel selection information inputted from an external source over time based on this counter information. As a result, the number of bits of the shift registers can be reduced to N/F bits.

That is, the N-bit counter CT in the channel selection clock generating section 14 changes the information of the shift register control signal f each 1/F of the period of the multiplexing period of the N-bit multiplexed signal stream. The N/F-bit shift registers REG-1 through REG-k time-divide the channel selection information inputted from an external source based on the shift register control signal f outputted from the N-bit counter, generates control signals $cnt_1$–$cnt_k$ based on this time-divided channel selection information, then sends these control signals $cnt_1$–$cnt_k$ to the channel selection clock generating circuit CGEN.

According to this structure, it is possible to achieve a channel-selection-type demultiplexing circuit which demultiplexes an ultra-high-speed multi-channel multiplexed signal (N-channel multiplexed signal stream) and outputs the demultiplexed signals to arbitrary channels, with a smaller number of circuits.

Figure 8:
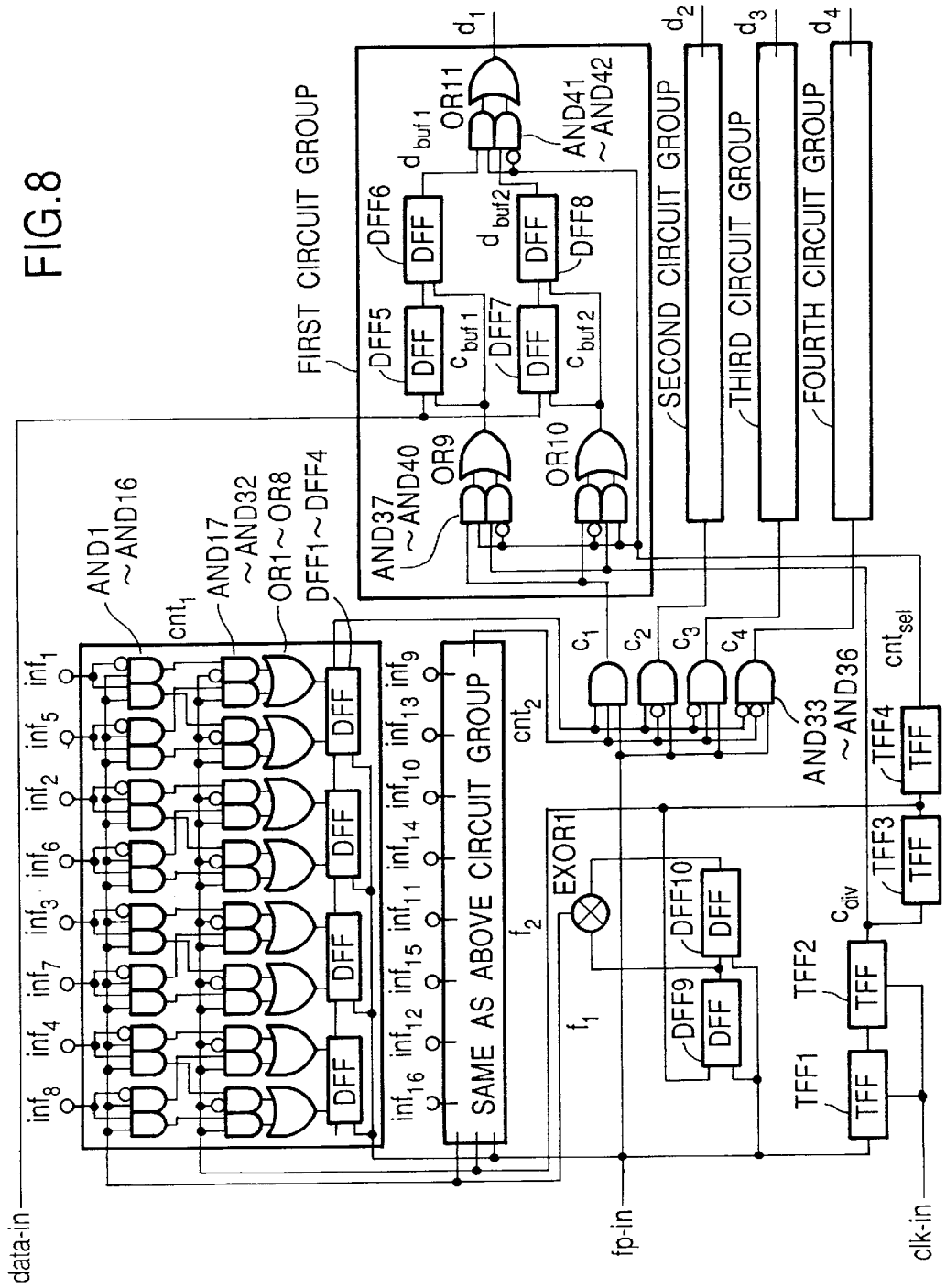
FIG. 8 is a circuit diagram showing the structure of a channel-selection-type demultiplexing circuit SC5a which is a specific example of the channel-selection-type demultiplexing circuit SC5.

FIG. 8 is a circuit diagram showing the structure of channel-selection-type demultiplexing circuit SC5a which is a specific example of the channel-selection-type demultiplexing circuit SC5.

The channel-selection-type demultiplexing circuit SC5a is a demultiplexing circuit which demultiplexes the 8-channel multiplexed signal stream data-in into four demultiplexed signals.

The channel-selection-type demultiplexing circuit SC4a has time series signal generator circuits which generate control signals $cnt_{SEL}$ for the demultiplexed channels forming an 8-bit time series generating circuit, wherein each time series generating circuit requires eight DFFs. On the other hand, the channel-selection-type demultiplexing circuit SC5a sets/resets the channel selection information for each N/F bits (F=2 in FIG. 8), and this channel-selection-type demultiplexing circuit SC5a is formed from N/F DFFs.

In the channel-selection-type demultiplexing circuit SC5a, as the trigger, a control signal $f_1$ having a period which is N/2 times is generated by DFF9, DFF10 and EXOR1. Additionally, the replacement order of the channel selection information is identified based on a control signal $f_2$ inputted from the TFF3. These control signals $f_1$ and $f_2$ are used to input the channel selection information into the DFF group. That is, in one N/2 times period, channel selection information $inf_1$–$inf_4$ are inputted, and in the next N/2 times period, channel selection information $inf_5$–$inf_8$ are inputted. The same is true of the other channel selection information. The other parts of the circuit are identical to those in the channel-selection-type demultiplexing circuit SC4a.

In this way, the present circuit allows the number of circuits for generating time series control signals to be further reduced when channel selection information is inputted to the DFF group forming the time series control signal generating circuit, by performing this inputting at N/F times the period.

Figure 9:
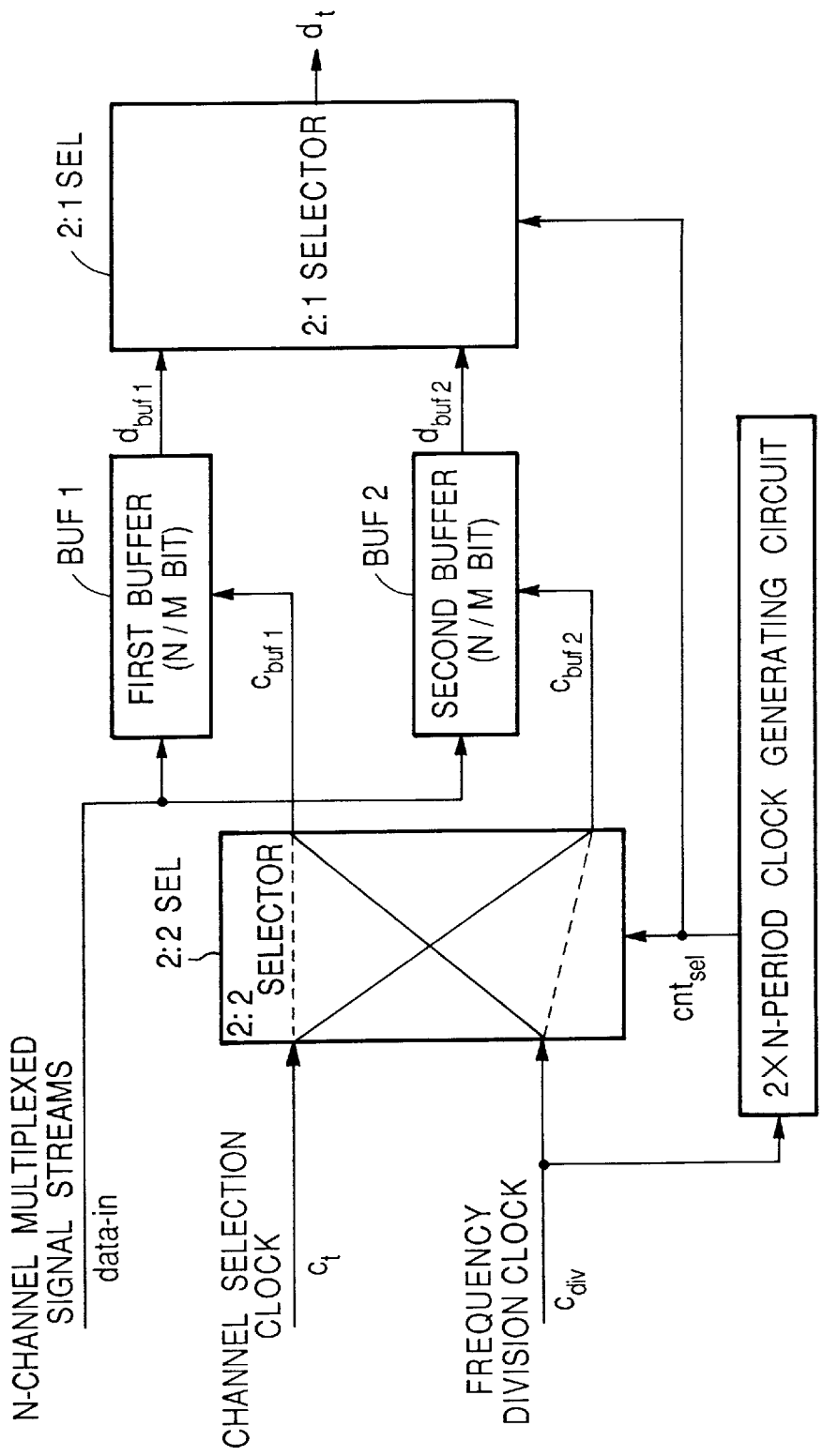
FIG. 9 is a block diagram showing an example of the structure of a bit demultiplexing circuit DMUX-1 in the channel demultiplexing section according to each of the above-mentioned embodiments.

FIG. 9 is a block diagram showing an example of the structure of a bit demultiplexing circuit DMUX-1 in a channel demultiplexing section according to the above-mentioned embodiment. The bit demultiplexing circuit DMUX-1 shown in FIG. 9 corresponds to claim 7.

The bit demultiplexing circuit DMUX-1 has a two-input two-output selector 2:2SEL, a first buffer BUF1, a second buffer BUF2, a two-input one-output selector 2:1SEL, and a 2×N-period clock generating circuit.

The two-input two-output selector 2:2SEL receives has the 2×N-bit period frequency division clock $cnt_{sel}$ as a control signal, and outputs the channel selection clock $c_t$ outputted by the channel selection clock generating section 10 and the frequency division clock $d_{div}$ outputted by the frequency division clock generating circuit 20 such as to alternate each time a clock pulse of the frequency division clock $cnt_{sel}$ is inputted. The first buffer BUF1 and the second buffer BUF2 are composed of N/M-bit shift registers or the like, and each latches the N-channel multiplexed signal stream data-in based on the clocks $c_{buf1}$ or $c_{buf2}$ outputted by the selector 2:2SEL, and supplies the latched signal to the selector 2:1SEL. The selector 2:1SEL selects one of two signal streams $d_{buf1}$ and $d_{buf2}$ respectively outputted by the first buffer BUF1 and the second buffer BUF2 in accordance with the frequency division clock $cnt_{sel}$. At this time, the selector 2:1SEL selects the output signal of the buffer to which the frequency division clock $c_{div}$ is supplied in the same manner as with selector 2:2SEL.

Due to the above-described structure, it is possible to achieve a channel demultiplexing section for a channel-selection-type demultiplexing circuit which demultiplexes an ultra-high-speed multiplexed signal (N-channel multiplexed signal stream) and outputs the demultiplexed signals to arbitrary channels.

The structures of the bit demultiplexing circuits in the channel demultiplexing sections 30, 31, 32, 33 and 34 in the above embodiment are identical to the structure of the bit demultiplexing circuit DMUX-1 shown in FIG. 9.

Figure 10:
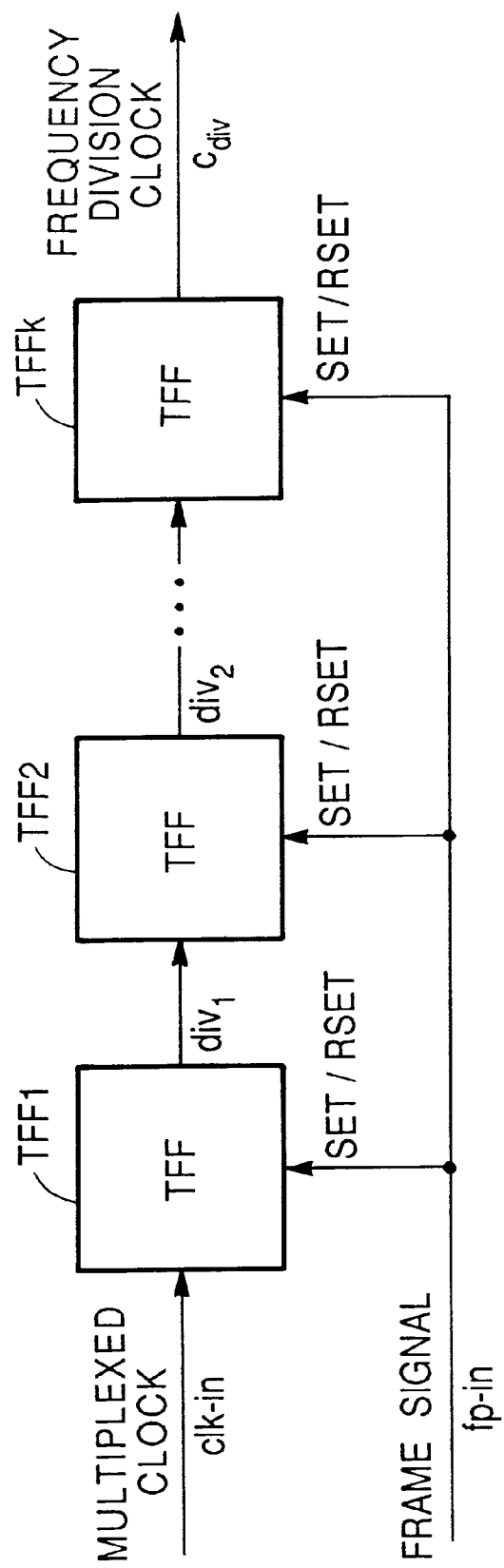
FIG. 10 is a block diagram showing a specific example of the frequency division clock generating section 20 according to each of the above-mentioned embodiments.
Figure 11:
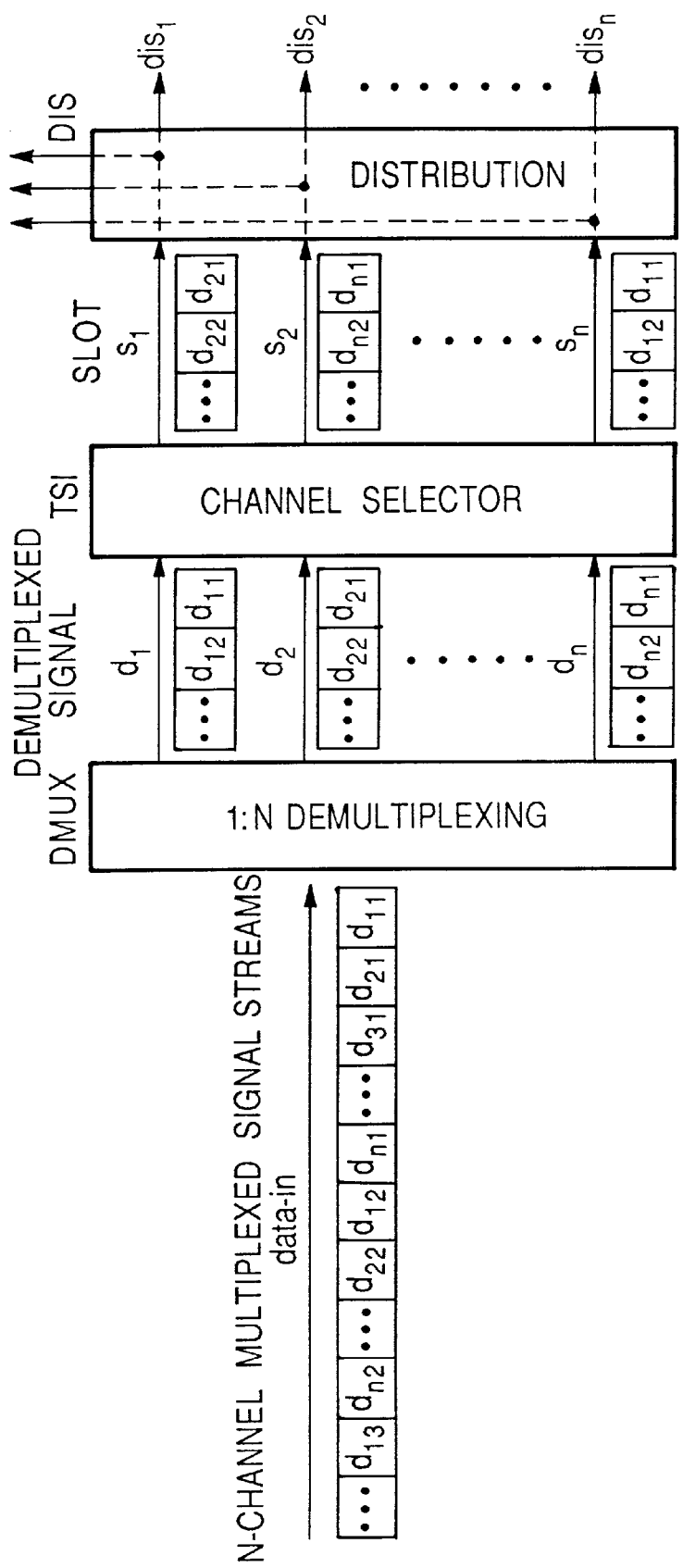
FIG. 11 is a block diagram showing an example of the structure of a demultiplexing section SC11 according to a conventional ADM device.
Figure 12:
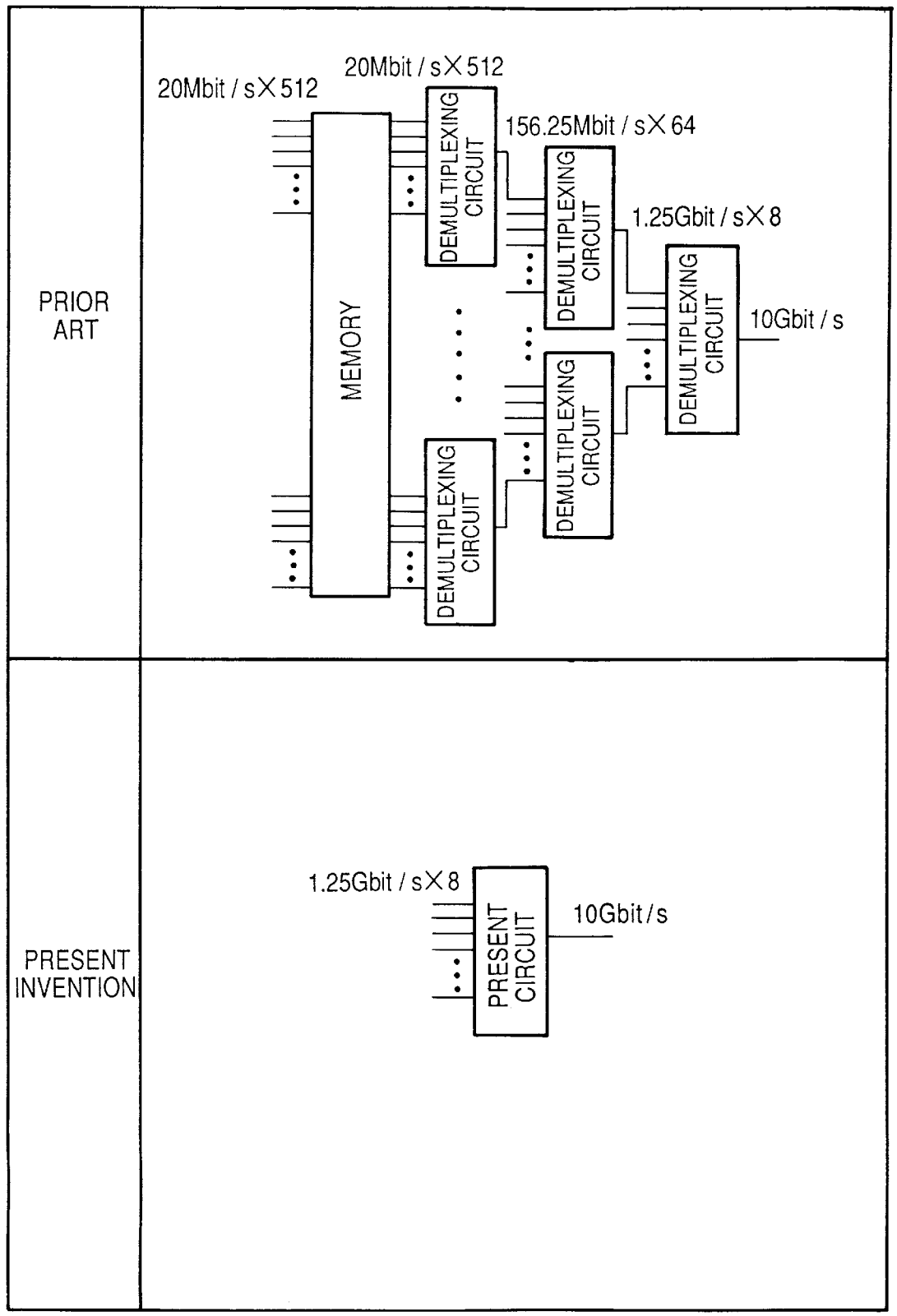
FIG. 12 is a diagram showing an example for comparing the conventional art and the present invention.
Figure 13:
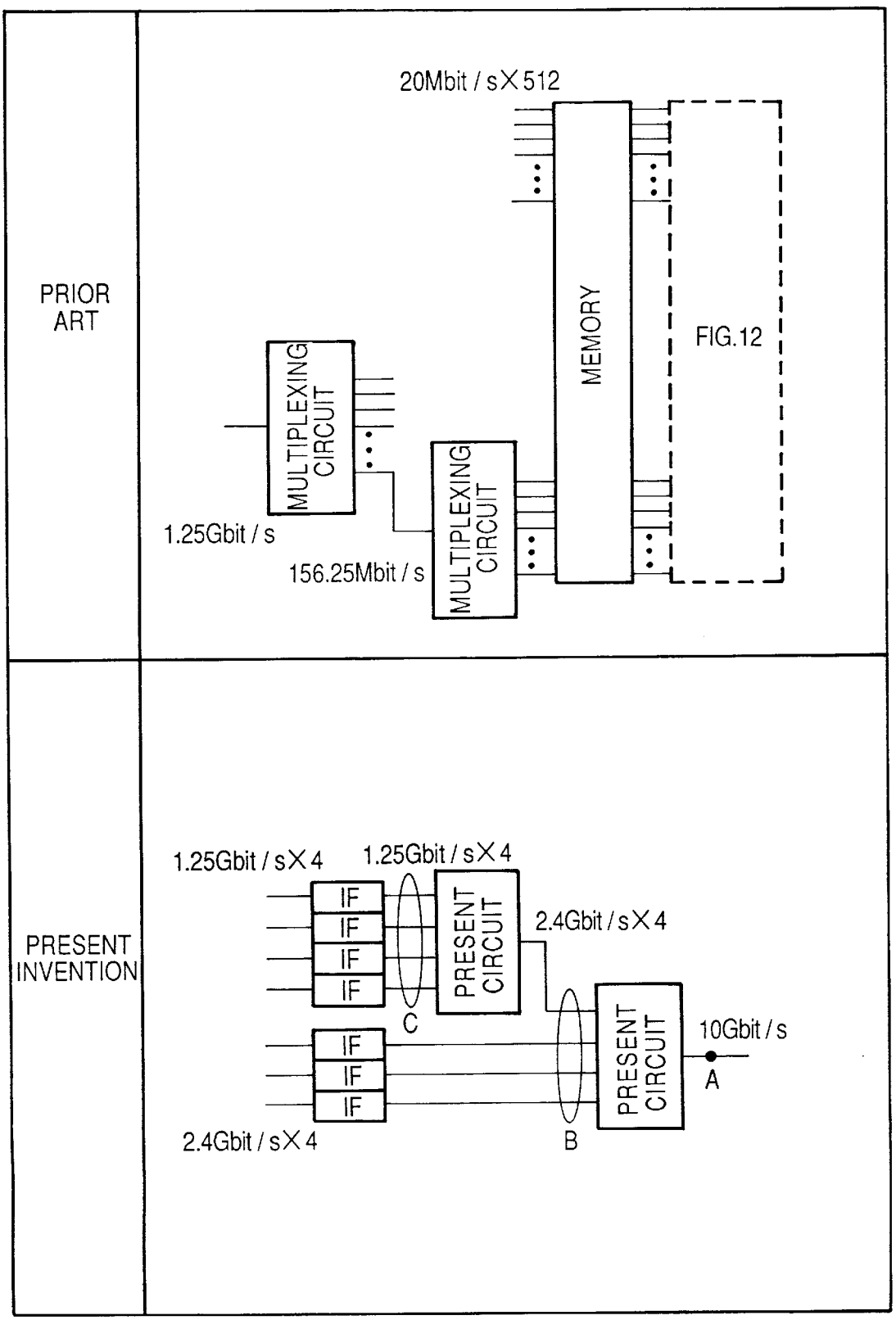
FIG. 13 is a diagram showing an example for comparing the conventional art and the present invention.
Figure 14:
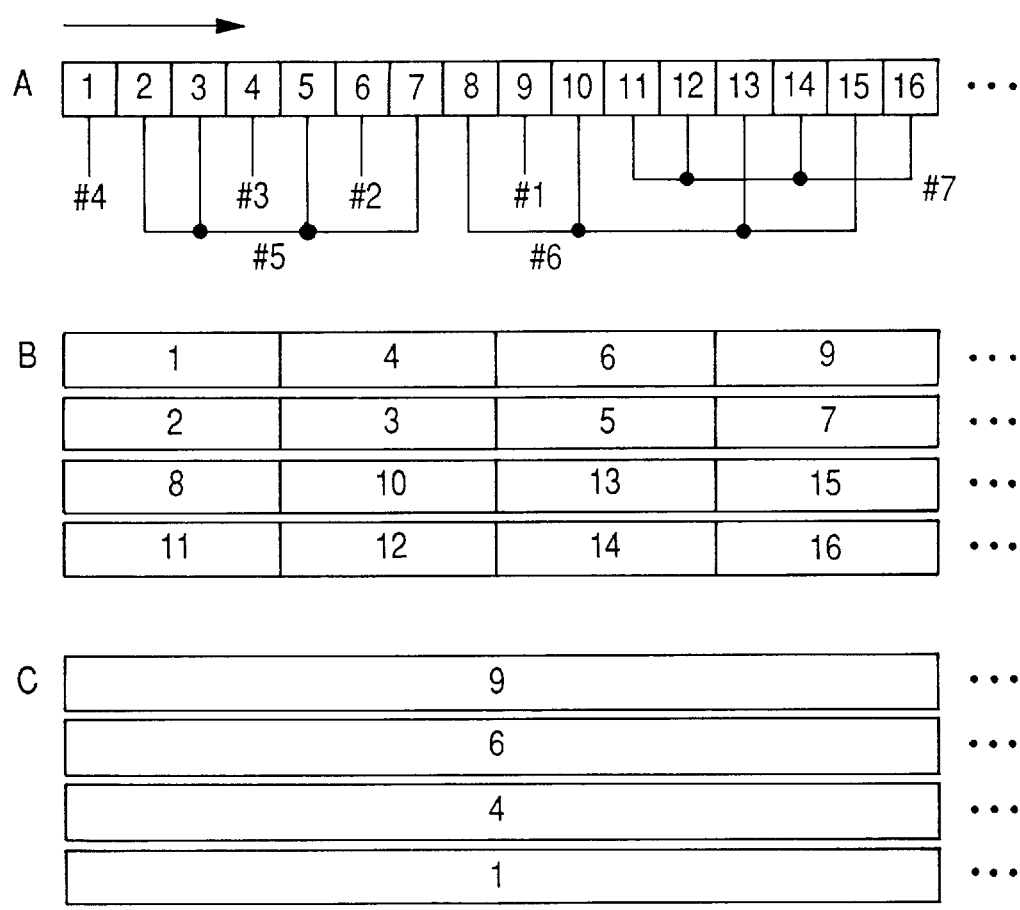
FIG. 14 is a diagram showing an example of a signal separation process according to the present invention shown in FIG. 13.
Figure 15:
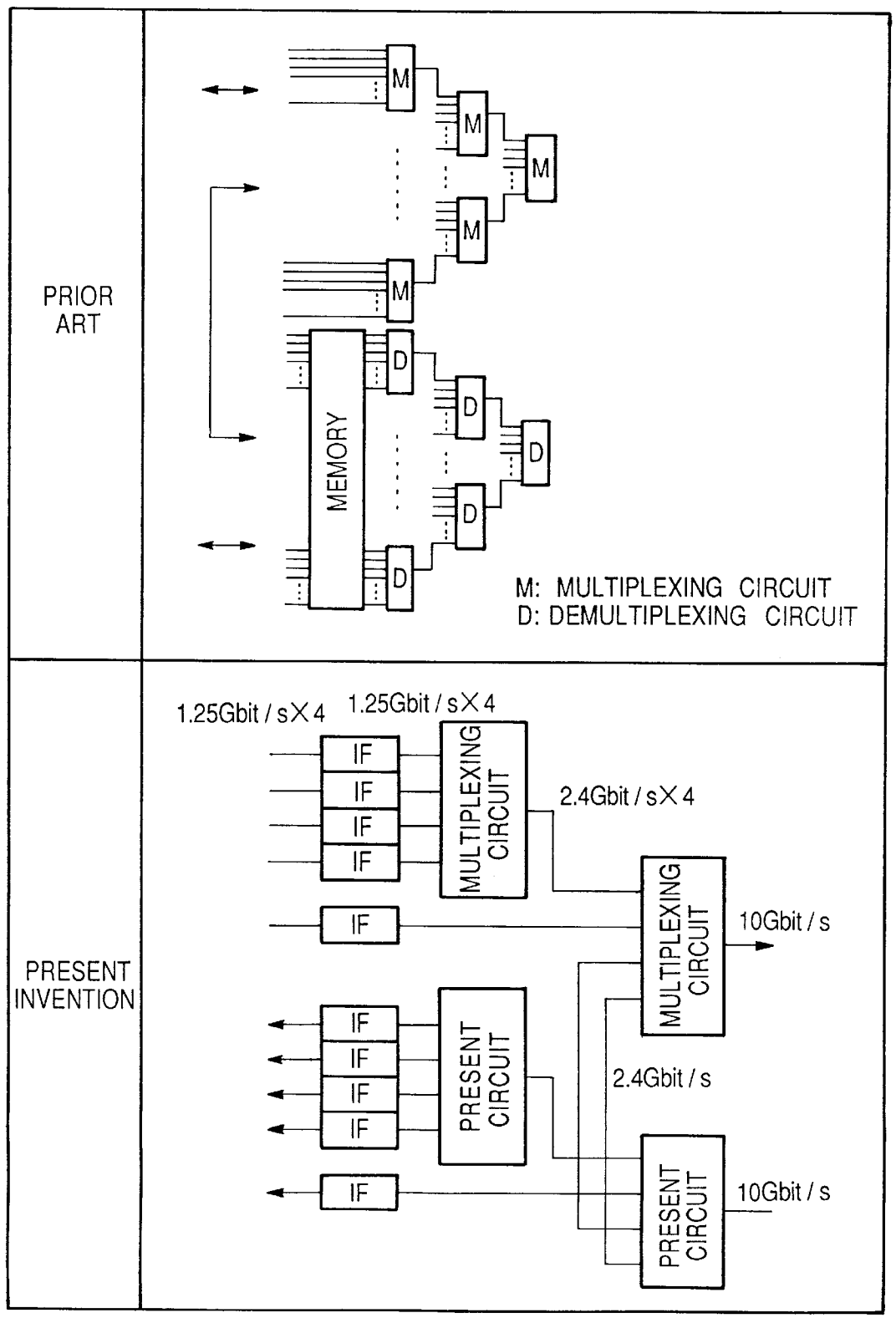
FIG. 15 is a diagram showing an example for comparing the conventional art and the present invention.

FIG. 10 is a block diagram showing a specific example of a frequency division clock generating section 20 according to the above embodiment. The frequency division clock generating section 20 shown in FIG. 10 corresponds to claim 8.

The frequency division clock generating section 20 has flip-flops TFF1, TFF2, . . . , TFFk as a frequency division circuit. TFF1 divides a multiplexed input clock clk-in inputted from an outside source to twice the period, TFF2 further divides the frequency division clock $div_1$ outputted by TFF1 to twice the period, and this is repeated until a frequency division clock $c_{div}$ with $2^k$ times the period is produced by the k flip-flops. Additionally, the k flip-flops TFF1–TFFk are set at specified values based on the frame synchronization signal $f_p$-in inputted from an external source, and produce a frequency division clock synchronized with the frame synchronization signal. In this case, instead of setting the flip-flops to specified values, the flip-flops may be reset based on the frame synchronization signal $f_p$-in.

Due to this type of structure, it is possible to achieve a frequency division clock generating section which produces a frequency division clock synchronized with the frame synchronization signal with $2^k$ times the period, in a channel-selection-type demultiplexing circuit which demultiplexes an ultra-high-speed multi-channel multiplexed signal (N-channel multiplexed signal) and outputs the demultiplexed signals to arbitrary channels.

We claim:

1. A channel-selection-type demultiplexing circuit, comprising:

M feedback-type N-bit shift registers (wherein N is the number of channels of the multiplexed signal stream) for inputting the channel selection information which assigns channel numbers of signals to be demultiplexed from the multiplexed signal stream and output channel numbers to which the demultiplexed signals are to be outputted;

a channel selection clock generating circuit for generating M types of channel selection clocks based on control signals outputted by said M feedback-type N-bit shift registers and supplying the channel selection clocks for selecting channel signals to be demultiplexed from a multiplexed signal stream to said channel demultiplexing section;

a frequency division clock generating section for generating a frequency division clock based on a multiplexed clock synchronized with the multiplexed signal stream; and a channel demultiplexing section for demultiplexing the multiplexed signal stream into M types of demultiplexed signals having periods which are M times the period of the multiplexed signal stream, wherein M is an integer less than the number of channels of the multiplexed signal stream, based on the channel selection clock outputted by said channel selection clock generating section and the frequency division clock outputted by said frequency division clock generating section.

2. A channel-selection-type demultiplexing circuit in accordance with claim 1, wherein said channel demultiplexing section generates a frame synchronization signal having a period which is M times the period of the multiplexed signal stream, based on a frame synchronization signal synchronized with the multiplexed signal stream.

3. A channel-selection-type demultiplexing circuit, comprising a plurality of unit channel-selection-type demultiplexing circuits in accordance with claim 2 which are connected in Q stages, wherein Q is an integer of at least 2 and wherein a number of unit channel-selection-type demultiplexing circuits belonging to each stage after a second stage is equal to the sum of demultiplexed signals outputted from the previous stage, and the demultiplexed signals outputted from each stage before a (Q−1)th stage are supplied to the unit channel-selection-type demultiplexing circuits belonging to the next stage as multiplexed signals.

4. A channel-selection-type demultiplexing circuit in accordance with claim 1, wherein said channel demultiplexing section comprises:
   a first buffer for inputting the multiplexed signal stream;
   a second buffer for inputting the multiplexed signal stream;
   a 2×N-period clock generating circuit for generating a clock having a period which is twice the period of the multiplexed signal stream, by further dividing the frequency division clock outputted by said frequency division clock generating section;
   a 2:2 selector for alternately selecting the channel selection clock outputted by said channel selection clock generating section and the frequency division clock outputted by said frequency division clock generating section based on the 2×N-period clock, and alternately supplying the selected clock to said first buffer and said second buffer; and
   a 2:1 selector for selecting and outputting the signals outputted by one of said first buffer and said second buffer, based on the 2×N-period clock.

5. A channel-selection-type demultiplexing circuit in accordance with claim 1, wherein said frequency division clock generating section comprises a frequency division circuit which is set to a specific value based on a frame synchronization signal synchronized with the multiplexed signal stream.

6. A channel-selection-type demultiplexing circuit, comprising:
   K feedback-type N-bit shift registers (wherein N is the number of channels of the multiplexed signal stream) for inputting the channel selection information which assigns channel numbers of signals to be multiplexed from the multiplexed signal stream and output channel numbers to which the demultiplexed signals are to be outputted;
   a channel selection clock generating circuit for generating M types of channel selection clocks based on control signals outputted by said K feedback-type N-bit shift registers and supplying the channel selection clocks for selecting channel signals to be demultiplexed from a multiplexed signal stream to said channel demultiplexing section;
   a frequency division clock generating section for generating a frequency division clock based on a multiplexed clock synchronized with the multiplexed signal stream; and
   a channel demultiplexing section for demultiplexing the multiplexed signal stream into M types of demultiplexed signals having periods which are M times the period of the multiplexed signal stream, wherein M is an integer less than the number of channels of the multiplexed signal stream, based on the channel selection clock outputted by said channel selection clock generating section and the frequency division clock outputted by said frequency division clock generating section; and
   wherein K is the minimum integer greater than or equal to (log M/log 2).

7. A channel-selection-type demultiplexing circuit in accordance with claim 6, wherein said frequency division clock generating section comprises a frequency division circuit which is set to a specific value based on a frame synchronization signal synchronized with the multiplexed signal stream.

8. A channel-selection-type demultiplexing circuit, comprising a plurality of unit channel-selection-type demultiplexing circuits in accordance with claim 7 which are connected in Q stages, wherein Q is an integer of at least 2 and wherein a number of unit channel-selection-type demultiplexing circuits belonging to each stage after a second stage is equal to the sum of demultiplexed signals outputted from the previous stage, and the demultiplexed signals outputted from each stage before a (Q−1)th stage are supplied to the unit channel-selection-type demultiplexing circuits belonging to the next stage as multiplexed signals.

9. A channel-selection-type demultiplexing circuit in accordance with claim 6, wherein said channel demultiplexing section comprises:
   a first buffer for inputting the multiplexed signal stream;
   a second buffer for inputting the multiplexed signal stream;
   a 2×N-period clock generating circuit for generating a clock having a period which is twice the period of the multiplexed signal stream, by further dividing the frequency division clock outputted by said frequency division clock generating section;
   a 2:2 selector for alternately selecting the channel selection clock outputted by said channel selection clock generating section and the frequency division clock outputted by said frequency division clock generating section based on the 2×N-period clock, and alternately supplying the selected clock to said first buffer and said second buffer;
   and a 2:1 selector for selecting and outputting the signals outputted by one of said first buffer and said second buffer, based on the 2×N-period clock.

10. A channel-selection-type demultiplexing circuit in accordance with claim 6, wherein said frequency division clock generating section comprises a frequency division circuit which is set to a specific value based on a frame synchronization signal synchronized with the multiplexed stream.

11. A channel-selection-type demultiplexing circuit comprising:

an N-bit counter for generating a clock having a period which is 1/F times the period of the multiplexed signal stream which has a period of N bits, (wherein N is the number of channels in the multiplexed signal stream and N/F is an integer);

K types of feedback-type N/F-bit shift registers for sequentially selecting a portion of the channel selection information which assigns channel numbers of signals to be demultiplexed from the multiplexed signal stream and output channel numbers to which the demultiplexed signals are to be outputted based on the clock having 1/F times the period, and inputting the selected channel selection information; and a channel selection clock generating circuit for generating M types of channel selection clocks for selecting channel signals to be demultiplexed from a multiplexed signal stream based on control signals outputted by said K feedback-type N/F-bit shift registers and supplying the channel selection clocks to said channel demultiplexing section;

a frequency division clock generating section for generating a frequency division clock based on a multiplexed clock synchronized with the multiplexed signal stream;

a channel demultiplexing section for demultiplexing the multiplexed signal stream into M types of demultiplexed signals having periods which are M times the period of the multiplexed signal stream, wherein M is an integer less than the number of channels of the multiplexed signal stream, based on the channel selection clock outputted by said channel selection clock generating section and the frequency division clock outputted by said frequency division clock generating section; and wherein K is the minimum integer greater than or equal to (log M/log 2).

12. A channel-selection-type demultiplexing circuit in accordance with claim 11, wherein said channel demultiplexing section generates a frame synchronization signal having a period which is M times the period of the multiplexed signal stream, based on a frame synchronization signal synchronized with the multiplexed signal stream.

13. A channel-selection-type demultiplexing circuit, comprising a plurality of unit channel-selection-type demultiplexing circuits in accordance with claim 12 which are connected in Q stages, wherein Q is an integer of at least 2 and wherein a number of unit channel-selection-type demultiplexing circuits belonging to each stage after a second stage is equal to the sum of demultiplexed signals outputted from the previous stage, and the demultiplexed signals outputted from each stage before a (Q−1)th stage are supplied to the unit channel-selection-type demultiplexing circuits belonging to the next stage as multiplexed signals.

14. A channel-selection-type demultiplexing circuit in accordance with claim 11, wherein said channel demultiplexing section comprises:

a first buffer for inputting the multiplexed signal stream;

a second buffer for inputting the multiplexed signal stream;

a 2×N-period clock generating circuit for generating a clock having a period which is twice the period of the multiplexed signal stream, by further dividing the frequency division clock outputted by said frequency division clock generating section;

a 2:2 selector for alternately selecting the channel selection clock outputted by said channel selection clock generating section and the frequency division clock outputted by said frequency division clock generating section based on the 2×N-period clock, and alternately supplying the selected clock to said first buffer and said second buffer; and a 2:1 selector for selecting and outputting the signals outputted by one of said first buffer and said second buffer, based on the 2×N-period clock.

15. A channel-selection-type demultiplexing circuit in accordance with claim 11, wherein said frequency division clock generating section comprises a frequency division circuit which is set to a specific value based on a frame synchronization signal synchronized with the multiplexed stream.

* * * * *